United States Patent
Huang et al.

(10) Patent No.: US 11,482,008 B2
(45) Date of Patent: Oct. 25, 2022

(54) DIRECTING BOARD REPOSITIONING DURING SENSOR CALIBRATION FOR AUTONOMOUS VEHICLES

(71) Applicant: NVIDIA CORPORATION, Santa Clara, CA (US)

(72) Inventors: Ziqiang Huang, Palo Alto, CA (US); Lin Yang, San Carlos, CA (US); Mark Damon Wheeler, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 262 days.

(21) Appl. No.: 16/920,105

(22) Filed: Jul. 2, 2020

(65) Prior Publication Data
US 2021/0004610 A1 Jan. 7, 2021

Related U.S. Application Data

(60) Provisional application No. 62/870,897, filed on Jul. 5, 2019.

(51) Int. Cl.
*B60W 60/00* (2020.01)
*G06T 7/73* (2017.01)
(Continued)

(52) U.S. Cl.
CPC .............. *G06V 20/56* (2022.01); *B60W 60/00* (2020.02); *G01S 7/4814* (2013.01);
(Continued)

(58) Field of Classification Search
None
See application file for complete search history.

(56) References Cited

U.S. PATENT DOCUMENTS

2005/0261573 A1  11/2005  Satoh et al.
2013/0325252 A1  12/2013  Schommer et al.
(Continued)

OTHER PUBLICATIONS

Ashdown et al., "Steerable Projector Calibration" 2005 IEEE Computer Society Conference on Computer Vision and Pattern Recognition (CVPR'05)—Workshops, Sep. 23, 2005.
(Continued)

*Primary Examiner* — Idowu O Osifade
(74) *Attorney, Agent, or Firm* — Maschoff Brennan

(57) ABSTRACT

According to an aspect of an embodiment, operations may comprise determining a target position and orientation for a calibration board with respect to a camera of a vehicle, detecting a first position and orientation of the calibration board with respect to the camera of the vehicle, determining instructions for moving the calibration board from the first position and orientation to the target position and orientation, transmitting the instructions to a device, detecting a second position and orientation of the calibration board, determining whether the second position and orientation is within a threshold of matching the target position and orientation, and, in response to determining that the second position and orientation is within the threshold of matching the target position and orientation, capturing one or more calibration camera images using the camera and calibrating one or more sensors of the vehicle using the one or more calibration camera images.

21 Claims, 22 Drawing Sheets

(51) Int. Cl.
*G06V 20/56* (2022.01)
*G01S 17/931* (2020.01)
*G01S 7/481* (2006.01)
*G01S 7/497* (2006.01)
*G01S 17/10* (2020.01)
*G01S 17/89* (2020.01)
*G01S 17/894* (2020.01)
*G06V 10/75* (2022.01)
*G05D 1/02* (2020.01)

(52) U.S. Cl.
CPC ............ *G01S 7/4817* (2013.01); *G01S 7/497* (2013.01); *G01S 17/10* (2013.01); *G01S 17/89* (2013.01); *G01S 17/894* (2020.01); *G01S 17/931* (2020.01); *G06T 7/74* (2017.01); *G06V 10/751* (2022.01); *B60W 2420/42* (2013.01); *B60W 2420/52* (2013.01); *G05D 1/0231* (2013.01)

(56) References Cited

U.S. PATENT DOCUMENTS

| | | |
|---|---|---|
| 2015/0341629 A1 | 11/2015 | Zeng et al. |
| 2016/0161602 A1 | 6/2016 | Prokhorov |
| 2016/0236617 A1* | 8/2016 | Smyth ...................... G01P 3/38 |
| 2019/0122386 A1 | 4/2019 | Wheeler et al. |

OTHER PUBLICATIONS

U.S. Appl. No. 16/920,141, filed Jul. 2, 2020.
U.S. Appl. No. 16/920,128, filed Jul. 2, 2020.

\* cited by examiner

DIRECTING BOARD REPOSITIONING DURING SENSOR CALIBRATION FOR AUTONOMOUS VEHICLES

CROSS-REFERENCE TO A RELATED APPLICATION

This patent application claims the benefit of and priority to U.S. Provisional App. No. 62/870,897 filed Jul. 5, 2019, which is incorporated by reference in the present disclosure in its entirety for all that it discloses.

FIELD

The embodiments discussed herein are related to maps for autonomous vehicles, and more particularly to directing board repositioning during calibration of sensors (e.g., LIDAR and camera) installed on vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise determining a target position and orientation for a calibration board with respect to a camera of a vehicle, detecting a first position and orientation of the calibration board with respect to the camera of the vehicle, determining instructions for moving the calibration board from the first position and orientation to the target position and orientation, transmitting the instructions to a device proximate the calibration board, detecting a second position and orientation of the calibration board with respect to the camera of the vehicle, determining whether the second position and orientation is within a threshold of matching the target position and orientation, and, in response to determining that the second position and orientation is within the threshold of matching the target position and orientation, capturing one or more calibration camera images using the camera and calibrating one or more sensors of the vehicle using the one or more calibration camera images.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
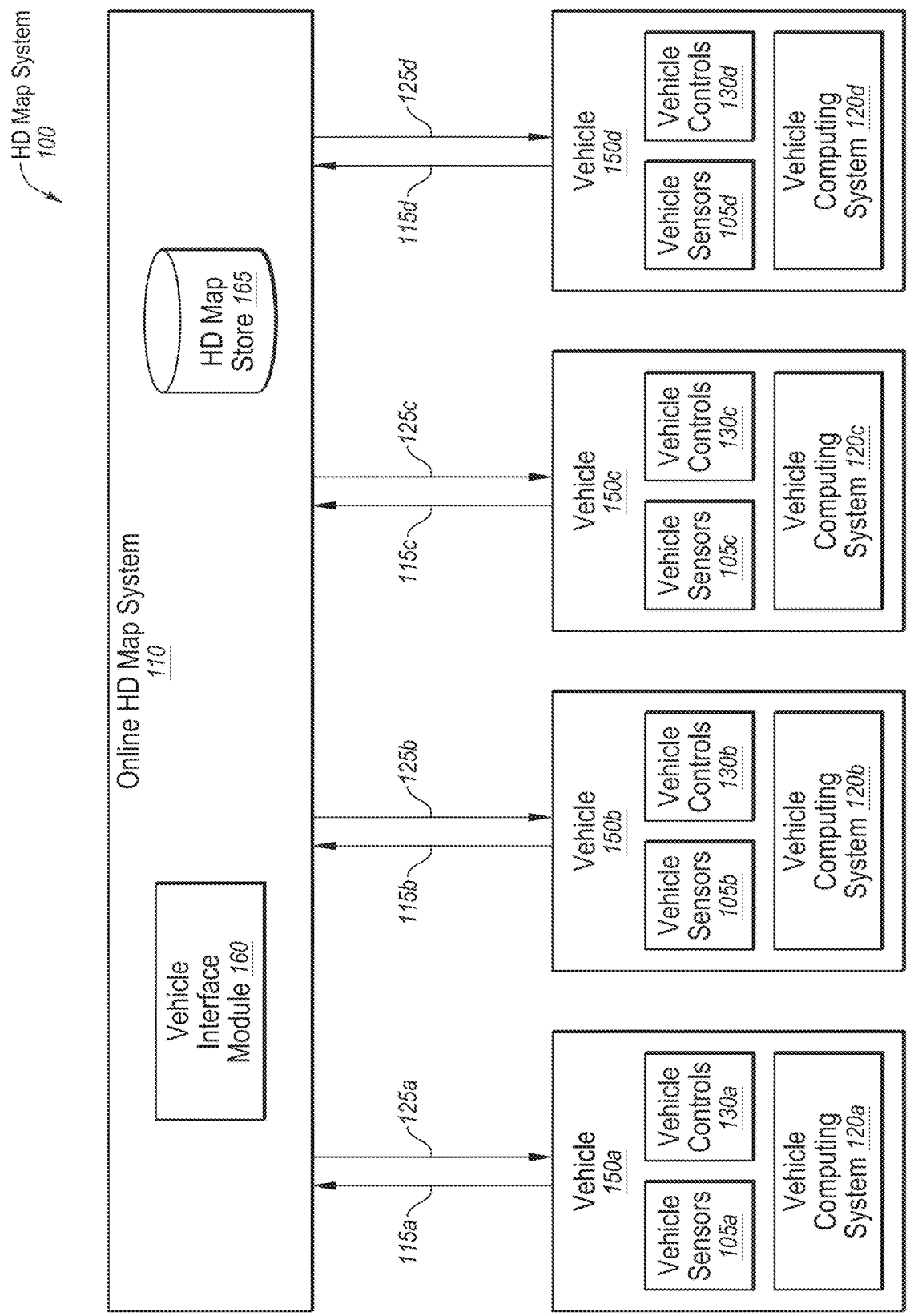
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may enable sensor calibration for autonomous vehicles. Autonomous vehicles may drive from a source location to a destination location without requiring a human driver to control and navigate the vehicle. Autonomous vehicles may use sensors (e.g., Light Detection and Ranging sensors (LIDARs) and cameras) to make driving decisions on the fly. However, sensors of autonomous vehicles may need to be calibrated before they can function accurately. Some embodiments disclosed herein may enable autonomous vehicle sensors to be calibrated using a board (e.g., a board having a checkerboard pattern, a diamond shape pattern, or some other pattern or combination of patterns) that is placed in front of the sensors. Further, some embodiments may utilize multiple types of sensors (e.g., LIDAR and camera) in the calibration process. Also, a system may perform calibration of sensors based on data collected by the sensors. Further, the system may include an application (or app) on a mobile device. The system may provide instructions to a user of the mobile device to accurately position a calibration board or the autonomous vehicle in desired test positions.

In some embodiments the system may perform calibration of a LIDAR and a camera mounted on a vehicle, for example, an autonomous vehicle. During calibration, the system may receive one or more LIDAR scans from the LIDAR and one or more camera images from the camera. Some embodiments may allow calibration of sensors of vehicles without requiring extensive manual setup or expert help. As a result, sensors of vehicles can be calibrated on a regular basis. This may allow accurate correlation of data obtained by different sensors for combining the data. Since HD maps may be generated by combining data captured by different sensors, embodiments of the invention may improve the quality of maps generated as well as the efficiency of map generation. Further, some embodiments disclosed herein may use the calibration of the sensors of the vehicle for improved navigation of the vehicle.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
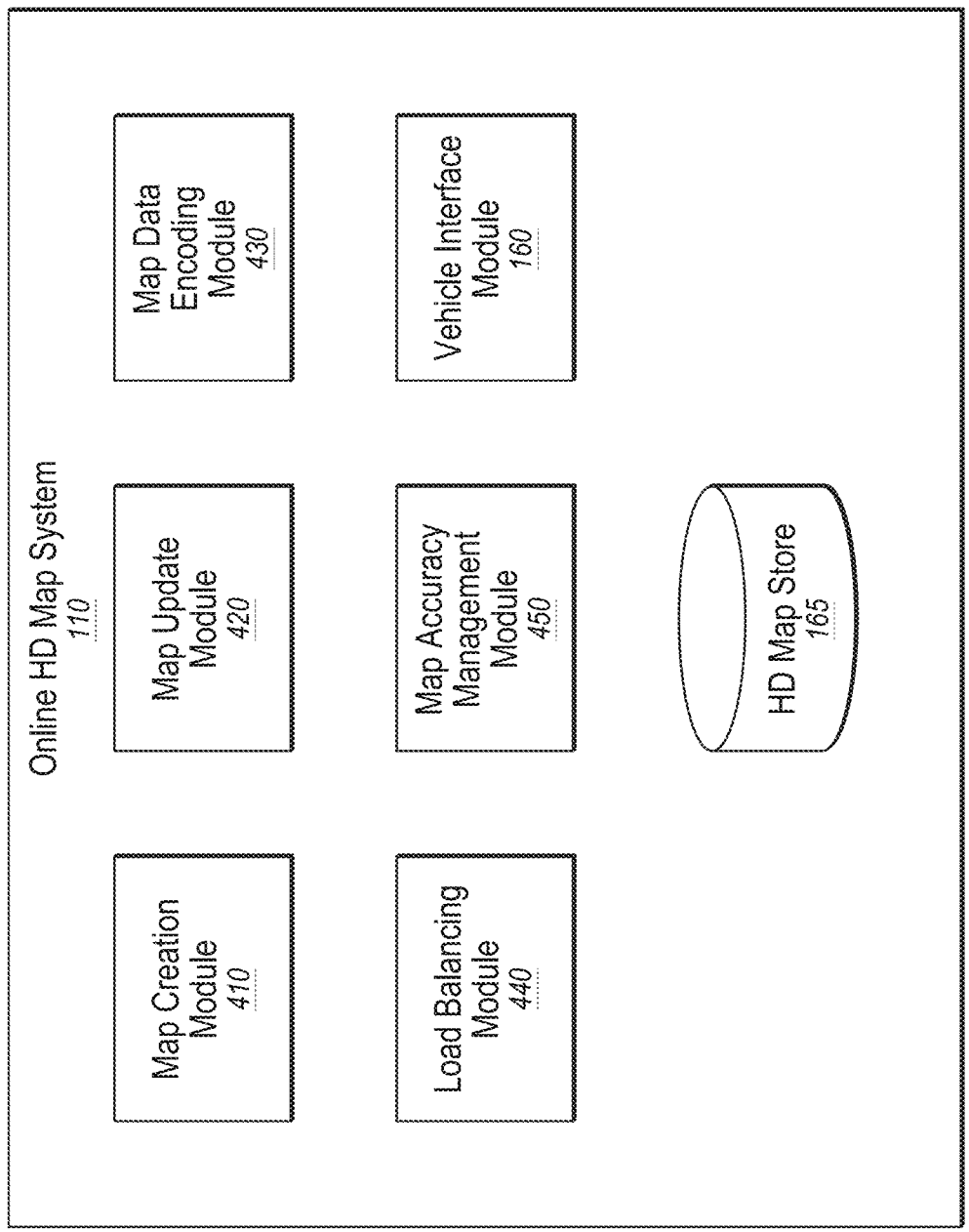
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
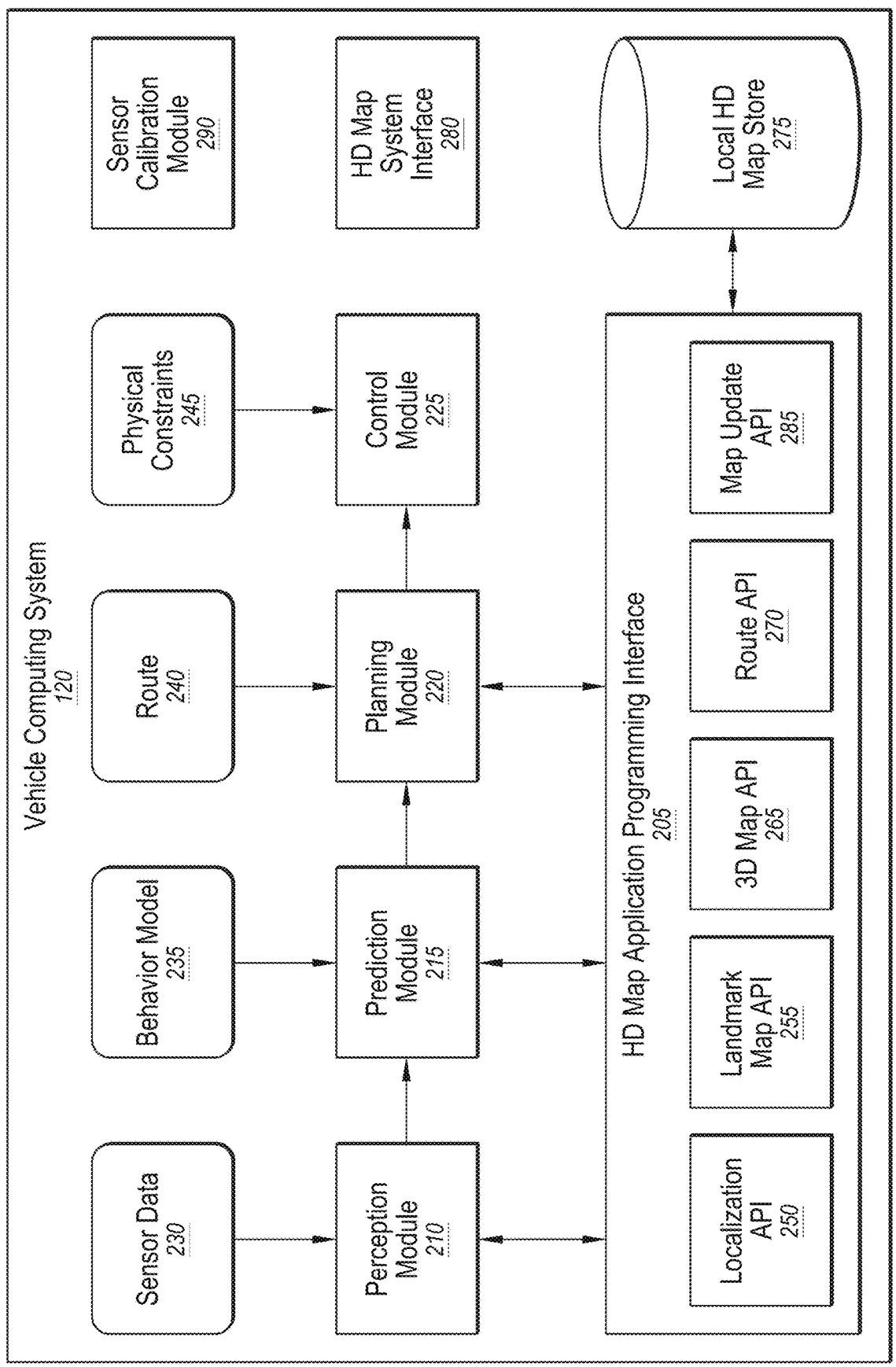
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a sensor calibration module 290, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
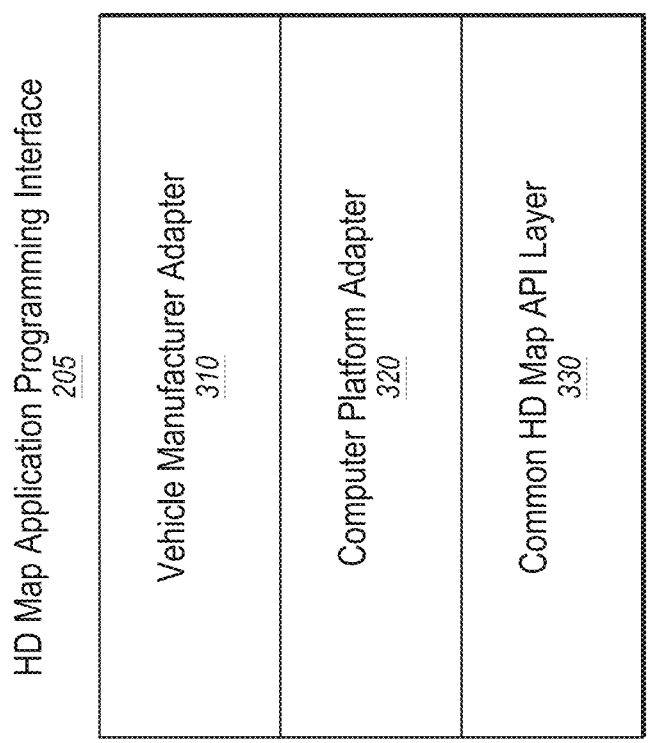
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, a localization module 460, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
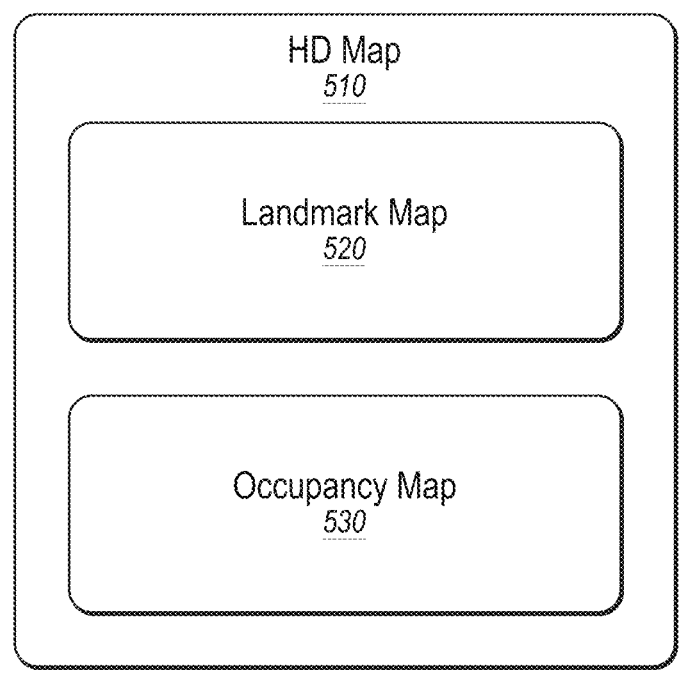
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
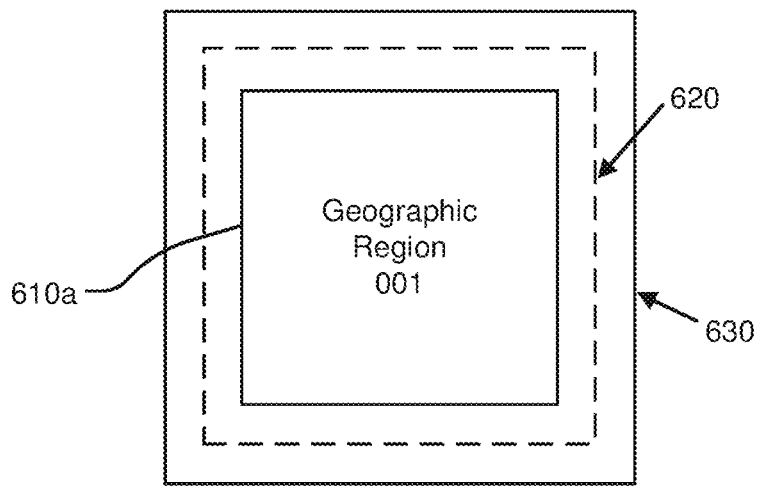
FIGS. 6A-6B illustrate example geographical regions defined in an HD map.
Figure 6B:
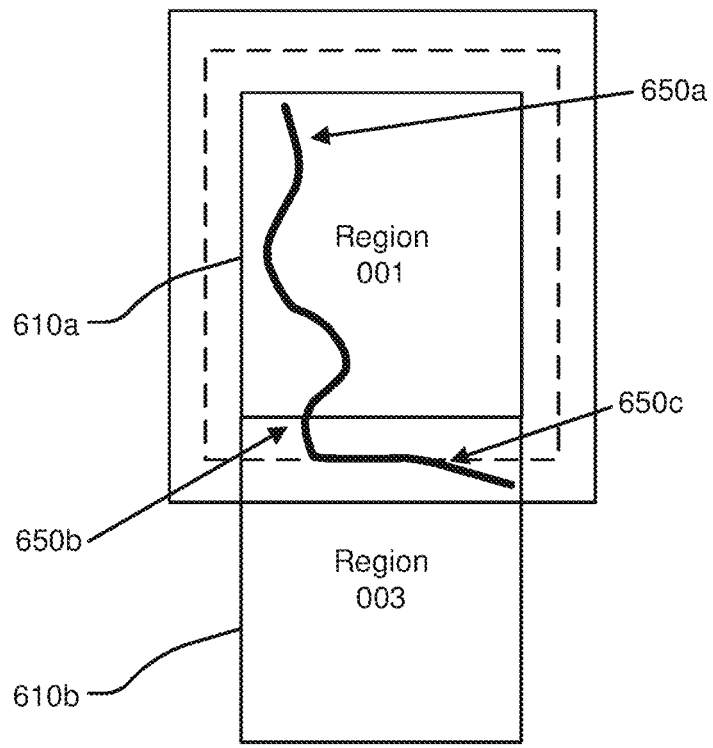

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
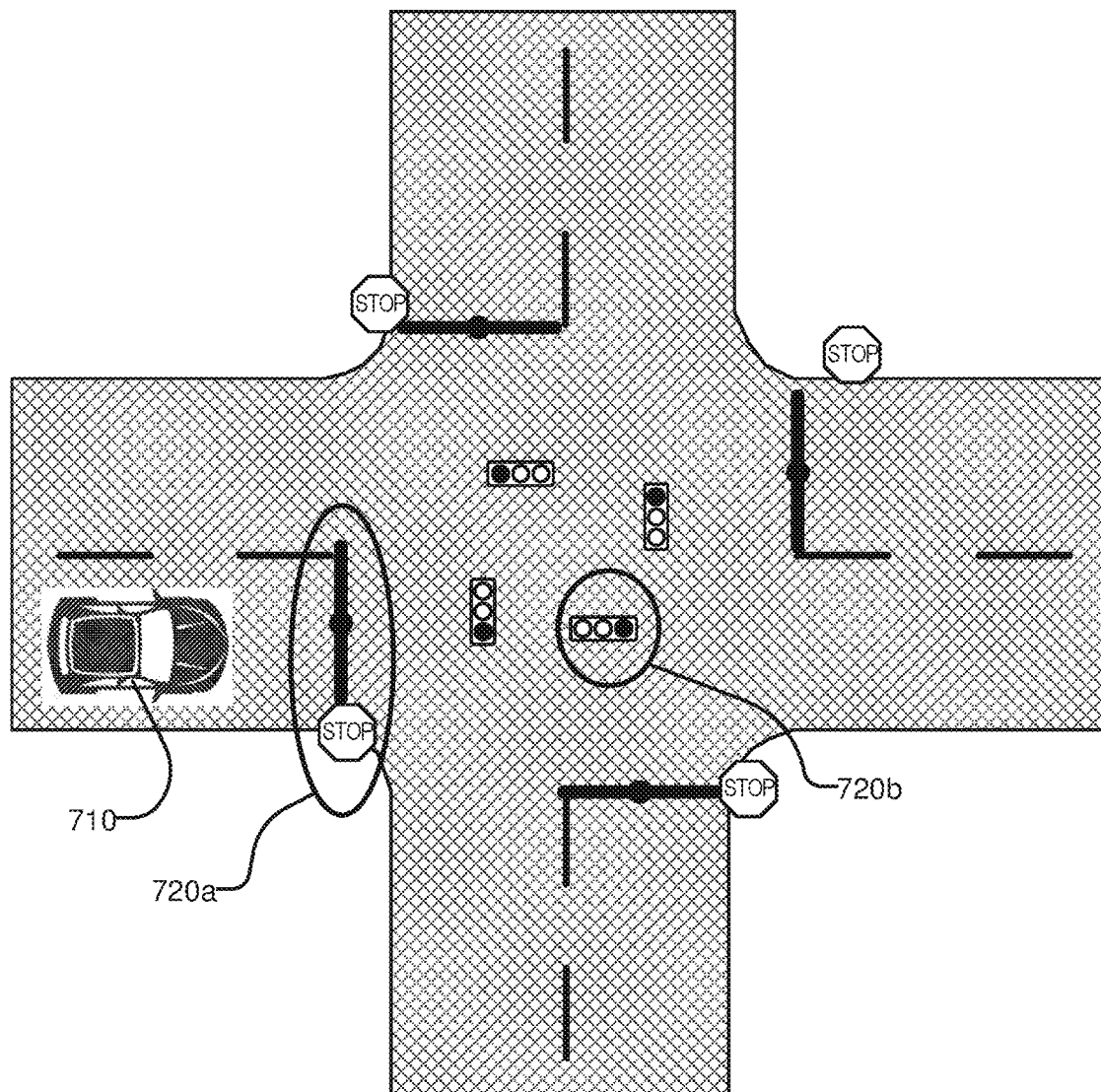
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
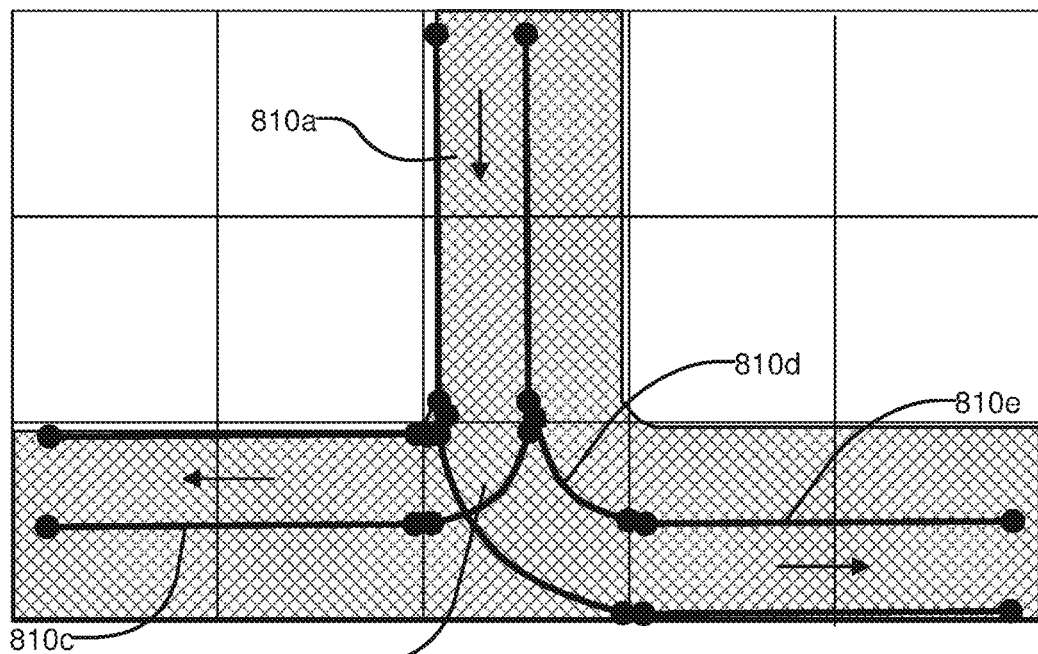
FIGS. 8A-8B illustrates example lane elements and relationships between lane elements in an HD map.
Figure 8B:
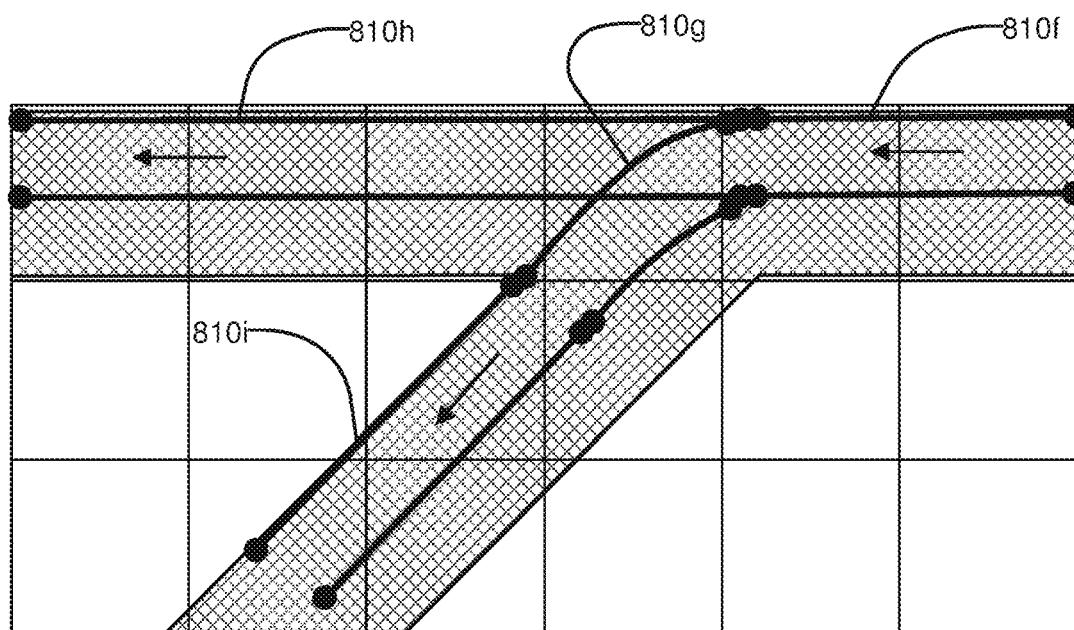

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810*i* via lane 810*g*. The HD map system 100 may determine a route from a source location to a destination location as a sequence of connected lane elements that can be traversed to reach from the source location to the destination location.

Sensor Calibration

Additional details regarding sensor calibration may be found in U.S. Patent Application Publication 2019/0120947 A1, published Apr. 25, 2019, and may be found in U.S. Patent Application Publication 2020/0145569 A1, published May 7, 2020, each of which is incorporated by reference in the present disclosure in its entirety for all that it discloses.

Interactive Calibration

In some embodiments, a user may use an interactive calibration tool on a mobile device (e.g., a smartphone or a tablet) to assist with calibration, including camera intrinsic calibration, camera extrinsic calibration (also referred to as stereo calibration), LIDAR to LIDAR calibration, and camera to LIDAR calibration. The interactive calibration tool may be an application (e.g., an app) on the mobile device.

For camera intrinsic and stereo calibration, an interactive calibration tool on the mobile device may display desired checkerboard poses and may provide instructions to a user regarding how to move the target checkerboard. The camera intrinsic calibration may account for internal distortions of a sensor. For example, a real world straight line may appear curved in a raw image captured by a camera. The camera intrinsic calibration may cause the system to interpret the captured curved line as a straight line in the real world. The stereo calibration may adjust for differences in alignment between multiple sensors. The camera to LIDAR calibration may match the 2D data captured by the cameras with the 3D data captured by the LIDAR. For camera to LIDAR calibration, the interactive calibration tool may collect data while users are driving the vehicle, and the interactive calibration tool may automatically perform the calibration calculations after sufficient data is collected.

In some embodiments, the application may provide instructions to a user who is holding the checkerboard. The application may display a test position where the user should place the checkerboard. In some embodiments, the test position may be displayed as a rectangle on the user interface of the mobile device. The application may also provide directional instructions to the user regarding how to move in order for the user to place the checkerboard in the correct test position. For example, the application may instruct the user to move forward, move backwards, move left, move right, rotate the checkerboard, adjust the yaw of the checkerboard, etc. The directional instructions, in combination with the displayed test position, may allow the user to position the checkerboard with a high degree of accuracy, as well as to maintain the desired position of the checkerboard over a period of time while images of the checkerboard are captured.

In some embodiments, the application may provide an audio indication and/or a visual indication that the checkerboard is in the correct location. For example, the rectangle representing the test position may change colors in response to the checkerboard being close to, or within, the correct position. In some embodiments, the application may display a separate indicator, such as a graphical representation of a traffic light. When the checkerboard is not close to the test position, the traffic light may be red; when the checkerboard is close to the test position, the traffic light may be yellow; when the checkerboard is within the test position, the traffic light may be green.

The rectangle may change color when the user has positioned the checkerboard inside the rectangle to indicate that the checkboard is in the correct position. The system may capture a minimum number of valid images, such as six images, while the checkerboard is in the correct position. A counter may display the number of valid images taken while the checkerboard is in the correct position. In some embodiments, the rectangle or the checkerboard may change color when the minimum number of valid images have been captured.

After the system has captured sufficient data for a pose, the system may select a subsequent pose. The application may display a new rectangle to the user, and the user may move the checkerboard to the location of the new rectangle. The application may provide directional instruction to the user regarding how to move the checkerboard to the new rectangle.

The application may calculate on the fly how many poses are required. For intrinsic calibration, the system may have a default value of about 16 poses for calibration. For stereo calibration, the system may have a default value of about 12 poses for calibration. However, the system may determine that the calibration is sufficiently accurate prior to the default number of poses being captured, and the system may end the calibration process. In contrast, the system may determine that the calibration is not sufficiently accurate after the default number of poses, and the system may request additional poses.

Once the images for all the poses have been captured, the system may perform the calibration computation. In some embodiments, the calibration computation may be performed by in-vehicle software. In other embodiments, the calibration computation may be performed on the mobile device or on a remote server. The application may display an indication of how accurate the calibration is.

For camera to LIDAR calibration, a checkerboard and/or a diamond board may be placed at a fixed location in a scene. The diamond board may be a monochromatic board in the shape of a diamond. The diamond board may include tape which is reflective in the infrared spectrum. The reflective tape may be easily detected with LIDAR. The car may be driven in a pattern relative to the checkerboard, such as in a W-shaped pattern. The W-shaped pattern may allow the car to approach the checkerboard from different directions and locations. However, other pattern shapes may be used which provide translation, distance, and rotation data. The mobile device may instruct the user how to drive the car (e.g. to go forward, go backwards, turn right, turn left). The mobile device may display a desired position of the checkerboard or diamond board relative to the car, and the mobile device may instruct the user how to move the car until the car is in the correct position. The system may collect approximately 45 frames. The calibration may take less than 5 minutes. The mobile device may display how many frames have been collected. The mobile device may indicate to the user when the adequate number of frames have been collected.

For any two frames, the coordinates of the same calibration board corner in the corresponding two images may give one point2D-to-point2D correspondence. The system may use ICP to compute the relative LIDAR transform between the two LIDAR positions. Each correspondence may give one coplanarity constraint. The system may minimize the square sum of all coplanarity constraints.

LIDAR to Camera Calibration

In some embodiments, a board (checkerboard or another type of board) may be placed in front of the vehicle and detected by LIDAR as well as camera. The LIDAR may detect the shape of the board and the system may fit a plane through the set of points in LIDAR coordinates detected by the LIDAR corresponding to the board. The system may project the plane from the LIDAR coordinates to the camera coordinates. The camera image may then detect the board. The system may compute a transform from the patterns detected by the LIDAR to the patterns detected by the camera. The transform may provide the calibration between the LIDAR and the camera. The system may use a closed form solution that guarantees a global optimal solution.

The system may map a plane from one set of coordinates to another system of coordinates. In some embodiments, the system may use the following values to represent a plane: three values to represent a vector normal to the plane, and a value (or values) to represent a base point on the plane. The system may use a transform from the representation of the plane from one coordinate to another.

In some embodiments, the board placed in front of the vehicle may show a diamond shape. The diamond shape may be made of a highly reflective material against a dark background (e.g., a black background). The board may be placed in front of the vehicle for both LIDAR and camera to capture. The use of intensity may make the diamond shape easily visible by LIDAR as well as camera. The system may detect the intensity edges and four corners of the diamond shape. In some embodiments, the system may detect the edges in the LIDAR scan or camera images and may fit a line through the edges. The system may detect the intersections of the lines to identify the corners. The system may match the corners and edges across the two coordinate systems (one of LIDAR and one of camera) and may determine the transformation for mapping objects from one coordinate system to the other for calibrating the sensors. The system may use the transform determined for matching data captured by one sensor against data captured by another sensor for example, for localization or for alignment of data for building the HD map. The LIDAR scan may not detect the edges accurately. However, the dimensions of the diamond shape (or any other shape) may be known (predetermined). Since the system may have accurate depth measurement of the board based on the LIDAR scan, the system may compare the known dimensions of the board against the dimensions determined by the LIDAR scan to improve the accuracy of the location of the diamond shape. For example, the system may place the predetermined diamond shape at that plane where the LIDAR detects the board and adjusts the position of the placed diamond to align with the detected edges. Once the difference between the placed diamond and the detected edges is minimized, the system may use the position of the placed diamond as the final position of the board in the LIDAR coordinates.

In some embodiments, the board may show a checkerboard pattern with two dots. For example, the checkerboard may have alternate blocks (or boxes) of black and white color and there may be white dots in a black blocks or black dots in white blocks. There may be one dot per block. If the checkerboard is partially out of view, and if the system is able to identify the two dots, the system may use the position of the two dots to identify the position of all the blocks since the dots uniquely identify the blocks that they are present in. Accordingly, the system may identify the dots and may identify the position of the corners based on the position of the dots even if the corners are not visible. For example, the left edge of the board may be outside the field of view (FoV) of the right camera and/or the right edge of the board may be outside FoV of the left camera. However, the system may be able to detect the dots and locate the corners even if the corners are outside the FoV. In some embodiments, instead of the dots, the checkerboard pattern may have any other recognizable shape, for example, a small square, rectangle, an ellipse, or any complex/composite shape. If the dots have a different intensity from the surrounding block, a LIDAR may be able to detect them. Further, a color difference between the dot and its surrounding block may be detected by a camera.

In some embodiments, the object placed in front of the vehicle may be a three-dimensional cube. From a particular angle, the vehicle may be able to view three sides of the cube. The cube may be designed so each visible side has a different color (e.g., a first side having a red color, a second side having blue color, and a third side having green color). Each visible side may be along a different plane. The LIDAR may scan the cube. The system may use the color to identify the edges. For example, if a particular color channel is removed, that side may have a particular color value and the other two sides may have a zero color value. This may be repeated for each color channel. The system may determine the edges based on the colors and may use the edges to identify the corners (where the edges intersect). The LIDAR may detect three planes based on the change in depth for each plane. The LIDAR may fit three planes through the points and may detect the intersection of the planes to determine the edges. The system may determine the intersection of the edges to identify the corners. The system may map the edges and corners from one set of coordinates (e.g., LIDAR coordinates) to the other set of coordinates (e.g., image coordinates) and may determine a transformation to map the cube detected by a first sensor (e.g., the LIDAR) against the cube as detected by a second sensor (e.g., the camera). The system may use the transformation for calibration of the sensors. The cube may be placed at different positions within the FoV of the sensor and at different distances and the process may be repeated.

These techniques may assume an initial approximate transformation and may refine the transformation to get an accurate transformation. The approximate transformation may allow the system to determine an approximate position of the object (e.g., cube) so that the search for the object is limited to a smaller space.

Dynamic Exposure for Camera Calibration

In some embodiments, when a vehicle is being calibrated using a board such as, for example, a board with a checkerboard pattern or a diamond pattern, the lighting at different times of the day can be very different. For example, if the sunlight is too bright (strong), the board may be overexposed if the board is facing the sun. In this situation, the edges and corners of the pattern may be difficult to distinguish in the camera images and as a result, the measurements can be incorrect. Similarly, in other situations the pattern may be underexposed and appear too dark, again leading to incorrect measurements. The camera may typically adjust the exposure based on an aggregate value of brightness in the entire image (e.g., the full scene that is within the field of view). The camera may adjust the exposure so that the pixel value averaged across the image is 128 or so (e.g., if each pixel value can be within 0-255). If the current average pixel value across the image is too high (e.g., 200), the camera may adjust the exposure until the average pixel value across the image is lowered to a value close to 128. The camera may adjust the exposure by controlling one or more of: (1) aperture: controls the area over which light can enter the camera (2) shutter speed: controls the duration of the exposure and (3) ISO speed: controls the sensitivity of the camera's sensor to a given amount of light. For example, the camera may reduce the exposure by closing the aperture appropriately until the average pixel value across the image is close to 128. In some embodiments, the system (e.g., the vehicle computing system) may control the exposure of the camera by sending control signals to the camera, for example, control signals that close or open the aperture of the camera mounted on the autonomous vehicle. Typically, the board may cover only a small portion of the image. As a result, if another portion of the image is underexposed even though the board is over exposed, the system may increase the exposure of the camera since the average pixel value of the image indicates underexposure. In this situation, the system may be unlikely to be able to accurately measure the edges/corners of the checkerboard pattern (or any other pattern) as the pattern is overexposed.

In some embodiments, the system may provide direction via an application (e.g., a mobile application) to the user to place the board at a specific position for purposes of calibration. The system may assume that the board has been placed at the specified position. Since the size of the board may be predetermined (e.g., 0.5 meters×0.5 meters), the system may calculate the boundaries of the board, for example, as coordinates within the camera image where the board is expected to appear. The system may estimate the boundaries of the board by applying geometric functions to the distance of the board, the size of the board, and the position within the image where the user was instructed to place the board. The system may determine an aggregate (e.g., average) pixel value of the pixels within the area of the image where the board is expected to appear. The system may send controls signals to the camera to adjust the average pixel value of the area of the image where the board is expected to appear to a predefined value P (e.g., 128 or substantially close to 128). For example, if aggregate pixel value of the pixels within the area of the image where the board is expected to appear is greater than P, the system may send signals to the camera to reduce the exposure. If aggregate pixel value of the pixels within the area of the image where the board is expected to appear is less than P, the system may send signals to the camera to increase the exposure.

The camera exposure adjusted accordingly may be able to show the board with the correct exposure, even though the rest of the image may be over exposed or under exposed. The system may be able to accurately take measurements to determine where the edges/corners are based on the captured image. Accordingly, embodiments may allow the system to dynamically adjust the camera exposure such that the calibration can be performed accurately.

Camera Focus Check for Camera Calibration

In some embodiments, having a sharp focus with a camera may be important to image quality, which is in turn may be important to a number of other autonomous driving related tasks, such as perception, localization, and mapping. Sharp camera focus may also be important to sensor calibration. For example, if a calibration pattern (e.g., on a checkerboard) is blurry, it may be very difficult to compute accurate calibration parameters from it. Therefore, some embodiments may automatically check for camera focus.

In some embodiments, automatically checking for camera focus may include various steps. First, the system may we specify an ideal focal distance for the camera (e.g., for autonomous driving tasks, this distance may be in the range of 5-30 meters where the need for precise perception may be critical). Given a desired focal distance D, the system may compute one or more poses for the camera to observe a calibration pattern, such as a checkerboard. The poses can be specified in camera coordinates, and may be approximately D meters away from the camera and facing the camera center. In the framework of pose driven calibration, the checkerboard pattern may be detected by in-vehicle software, from which the system can derive its pose on the fly. The system can then compute the optimal movement (e.g., in one of the 6 dimensions, translation x, y, z, and roll, pitch, yaw) to get the board to the desired pose, and send this information to either a human operator, via a mobile app or voice instructions, or to a robotic operator, via wireless communication. Once the pattern is in the desired pose, they system may ask the human/robotic operator to stay still for a period of time (e.g., 3 seconds) and capture one or more frames with the camera. The requirement of staying still may avoid any blur caused by motion, as all blur in the captured image(s) should be caused by camera focus. Given a captured frame, the system may run the following algorithm to determine the amount of blur in the image, and therefore determine if the camera is sufficiently focused.

1. Detect checkerboard corners
2. Connect the outer corners to form a checkerboard polygon (e.g., this may be the region of interest for the following computation).
3. Compute the Laplacian of image pixels.
4. Within the region of interest only, aggregate the Laplacian values, and output the 99-percentile value as a sharpness score.
5. The camera focus is considered "good" if the sharpness score exceeds a certain threshold, and "not good" otherwise.

In some embodiments, an automatic tool for checking camera focus may be used on a vehicle each time that data collection begins (e.g., while the vehicle is in the garage). For example, this automatic tool may check for camera focus as part of the system health check. In some embodiments, this automatic tool may check for camera focus before sensor calibration, because the camera may need to be sufficiently focused for calibration to be successful. The same tool may also be used to assist focal adjustment. As an operator adjusts focus, the tool may output a sharpness score, and focal adjustment may be performed when the sharpness score falls below a certain threshold.

In some embodiments, automatically checking for camera focus may include pointing the camera to a checkerboard pattern, automatically detecting the pattern in the image (e.g., detecting four corners of the checkerboard pattern which form a region of interest), and computing a sharpness score in this region. If camera focus is good, the sharpness score should fall into a particular range, but if the sharpness score is not good, the sharpness score should fall outside this particular range.

In some embodiments, a sharpness score may be computing using a variety of methods. These methods include computing the maximum Laplacian of the image, computing the difference of Gaussian, etc. In some embodiments, computing the sharpness score of the image may be accomplished as follows:
1. checkerboard_corners<-findChessboardCorners(image)
2. checkerboard_polygon<-use first/last corner from first/last row to form a polygon of checkerboard pattern: this is the region of interest
3. laplacian<-Laplacian(image)
4. Aggregate all pixels from laplacian which are inside checkerboard_polygon (this can be done efficiently by using a mask image), and output 99-percentile laplacian value In some embodiments, the robustness of this computing of the sharpness score of the image may be verified against the following variables:
1. Relative car pose: since the position of the vehicle cannot be guaranteed to be identical, some changes in the camera distance and angle should not change the sharpness score significantly.
2. Lighting: under reasonable lighting the sharpness score should not change significantly.
3. Focal length: the system may test how the sharpness score changes as the system adjusts camera focus. This may help define the target range (e.g., the range may be small enough to ensure quality but also big enough to tolerate some error in manual adjustment).
4. Camera model: the system may determine how stable the sharpness score is among cameras of the same model (e.g., the sharpness score should be stable, assuming the cameras have identical configuration) and among cameras of different models (e.g., the range may need to be redefined for each camera model).

Improved Plane Fitting for Calibration

In some embodiments, if the LIDAR observes a board that is a planar structure, the LIDAR scan may comprise lines, with each line including several points. However, the points may not all be coplanar, and instead the points may be a set of points that form a blob in the neighborhood of the plane. The system may fit a plane through the set of points. The system may perform a least square error-based fit to determine a plane that minimizes the least squares error between the points and the plane (e.g., minimizes the sum of least squares of distance between the points of the set and the plane or minimizes the average point to plane distance between the points of the set and the plane).

However, the LIDAR can be viewed as a point that shoots rays from that point to the plane. The rays may not be normal to the plane and parallel to each other but may instead originate from the point that represents the LIDAR and may accordingly be at an angle with respect to each other. The system may determine the plane by minimizing the projection error along the direction of each ray from the point representing the LIDAR to a point on the plane. Accordingly, the system may use an optimization technique based on the loss function that determines a distance between the plane and each point in a direction that connects the point with the LIDAR center.

Pose Driven Calibration

The system (e.g., the vehicle computing system) may use a pose-based calibration method. The system may precompute, relative to the sensor, the positions where a target (e.g., a board) being sensed by the sensor needs to be positioned to calibrate the sensors. The system may provide guidance to a user to move with the board so as to cover these various positions with the board. The guidance may be provided by the system using an application, such as an application executing on a mobile device (e.g., a cell phone). The mobile application may provide instructions to the user regarding the position of the board. For example, in some embodiments, the mobile phone may be attached to the board or held close to the board and the system may provide instructions whether to move the board to reach the required pose. The system may also provide instructions explaining the length of time that the board needs to be held in a specific pose before moving to the next pose. The system may require the board to be held in a position for a particular length of time so that the sensor can capture sufficient number of data (e.g., images/frames/scans etc.) so as to get enough samples to determine an aggregate measure of error (e.g., an average error).

The precomputed positions may be determined so as to minimize the maximum error. The system may perform simulations over those poses to determine the worst case possible error. The system may perform a number of random calibrations in simulation. Although these techniques are applicable to camera calibration, these techniques may also apply to any sensor calibration such as, for example, LIDAR calibration, LIDAR to camera calibration, stereo calibration, etc. The system may assume a camera in the simulation and may calculates the error at every pixel. For each calibration, the system may determine the worst pixel error and may use that as the error of the calibration. For a specific board position, the system may run a number of calibrations of the board position and may take the worst error of all of these and uses that as the error for that board position. Accordingly, the system may use simulation to evaluate board positions based on worst case error rather than average error (e.g., because average error could be misleading).

The system may try different board positions until it determines worst case error that is in the target range that the system is trying to achieve. Once the system identifies these board positions, the system may include these board positions in calibration code to give instructions to users performing calibration to ensure that all these board positions are achieved. The mobile application may configure a user interface to indicate where the board should be positioned and where the board is currently present. This may help the user to move the board to position it accurately. The system may give directions to the user to move the direction in a particular direction to reach the next position and whether to tilt the board in a particular direction to achieve the required pose. The system may provide real-time feedback based on a device attached to the board as to what the user needs to do next. The instructions may be provided using voice commands.

The system may perform calibration continuously as the user moves the board to various positions. For example, the system may provide instructions to move the board to a particular position. The system may perform calibration of a sensor based on that position. The system may use the calibration for the next position provided to the user in the instructions where the user is supposed to take the board next.

Online Real-Time Calibration

In some embodiments, the vehicle may be driven along a route. The vehicle may be stopped at locations where there are certain features in the scene (e.g., poles, edges, buildings, etc.). The edges may be detected by LIDAR since there may be a range difference between the two sides of the edges. The camera image may also detect edges based high gradient pixels (e.g., adjacent pixels with more than a threshold value difference, such as where the edge of a pole shows the background (e.g., sky) on one side and the material of the pole on the other side). The system may perform ICP (e.g., real-time alignment as the vehicle drives) between the edges detected by the two types of sensors (LIDAR vs. camera). If the vehicle stops for calibration, the images/LIDAR scans may not have to be adjusted to account for the car movement (e.g., by unwinding).

In some embodiments, the vehicle may not stop and instead may keep moving. The vehicle may perform real-time alignment and may determines a pose at each time stamp. The vehicle may take two different poses determined at two time points and may determine the vehicle motion. The motion parameters may be used to unwind and adjust the point cloud for the vehicle movement. Accordingly, the calibration may be performed without the vehicle stopping (e.g., on a highway where the vehicle cannot stop). Since the vehicle does not have to stop, the vehicle can identify more features along the way (e.g., that may be encountered in places where the vehicle cannot stop). The process may be online since the calibration may be performed as a vehicle drives.

Some embodiments may use ground features such as, for example, marking on the road based on intensity difference that can be measured by a LIDAR as well as a camera. The system may identify edges as boundaries of high intensity points and low intensity points. The system may have to use different thresholds of intensity difference based on the type of surface and material on which the edge is identified. As the vehicle drives, the vehicle may receive a LIDAR scan and may identify ground points and may remove the non-ground points. The system may fit a ground plane through the ground points. The system may keep a histogram of intensity for the ground points. The system may determine a threshold based on the histogram. Accordingly, the system may use frames collected for a first time interval to build the histogram and subsequently may use the histogram to determine the threshold which can be used for determining edges based on intensity differences.

If the vehicle does not have to stop, the vehicle may collect a large number of frames for calibration since frames can be collected anytime the vehicle is driving. The system can choose frames that have a large number of features and can reject frames that do not have features in portions of the field of view that the system needs to calibrate.

The techniques may be used for offline calibration (e.g., when the vehicle stops running using previously collected samples). The system may run the calibration in the background while offline to determine whether there is a drift. The system may generate a trigger if the system detects that the calibration is not accurate or has drifted. The system may automatically perform calibration and may update the necessary transforms based on the calibration.

Lidar-to-Camera Calibration

Figure 9:
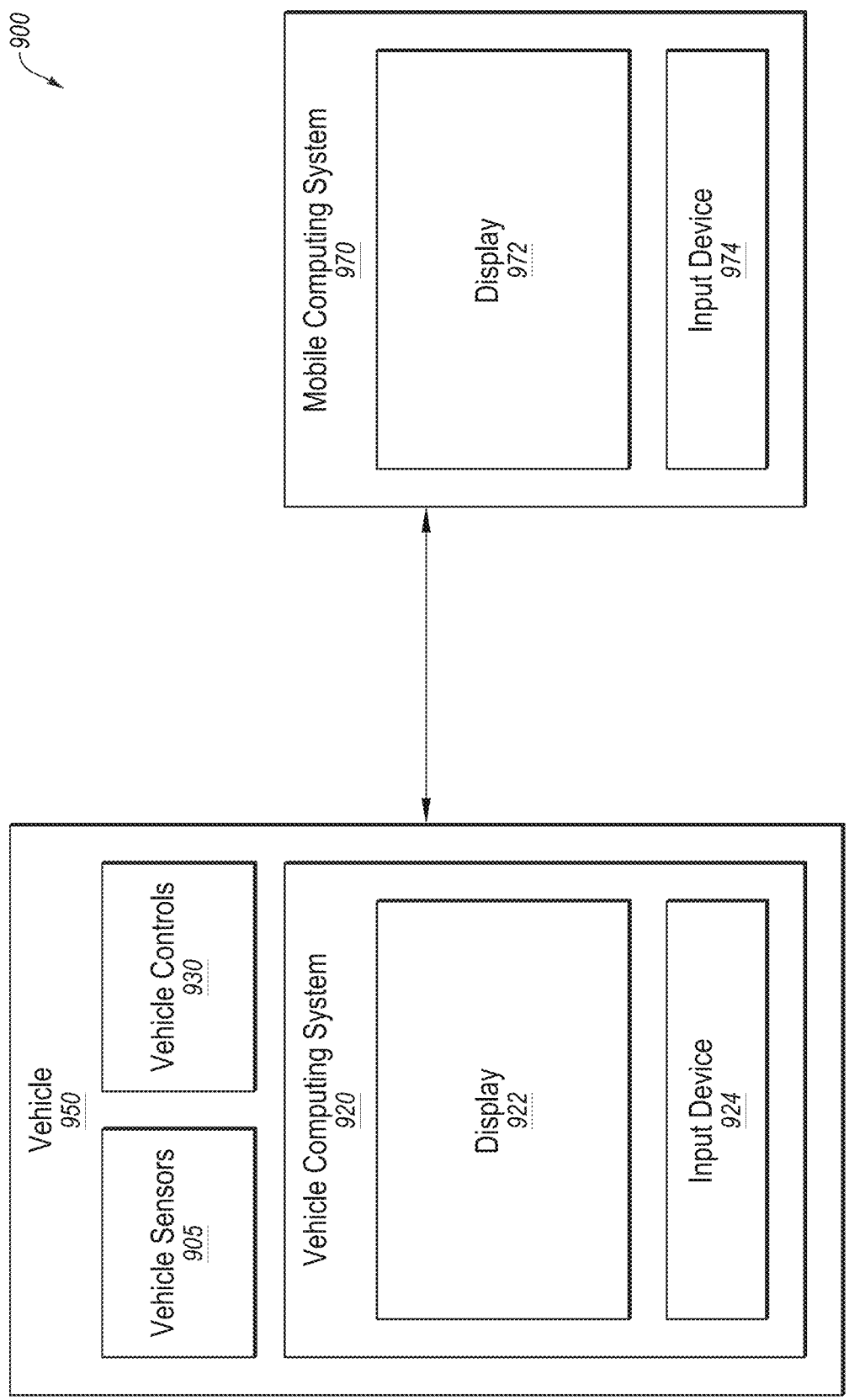
FIG. 9 illustrates an example system including a vehicle and mobile computing device to facilitate interactive sensor calibration for autonomous vehicles.

FIG. 9 illustrates an example system 900 including a vehicle 950 and mobile computing system 970 to facilitate interactive sensor calibration for autonomous vehicles, in accordance with one or more embodiments of the present disclosure. The vehicle 950 may utilize the vehicle sensors 905 to obtain data via which the vehicle computing system 920 may correlate at least a LIDAR sensor and a camera sensor of the vehicle sensors 905. In some embodiments, a user may provide input via an input device 924 of the vehicle computing system 920 and/or an input device 974 of the mobile computing system 970. In some embodiments, a user may hold a patterned sign or image and may receive feedback via the mobile computing system 970 regarding how the patterned sign or image is to be positioned to facilitate calibration of the vehicle sensors 905.

The vehicle sensors 905 may include any sensors, such as the vehicle sensors 105 of FIG. 1, and may include at least a camera and a LIDAR sensor. The vehicle computing system 920 may obtain LIDAR points from the LIDAR sensor and may obtain images from the camera. The LIDAR points may be projected onto and overlaid on the camera image and presented on the display 922.

In some embodiments, various calibrations approaches may be utilized. For example, a user may utilize a hand-held checkerboard or other visual aid in calibration of the LIDAR and/or camera sensors. However, without feedback the user may end up providing too much data in some areas and not enough in others, which may drag the calibration off from ground truth because of the disproportionate distribution of data. The user may utilize the mobile computing system 970 when holding and/or moving the checkerboard to receive instructions. For example, the mobile computing system 970 may connect with the vehicle computing system 920 via a hotspot or other wireless communication technology. The vehicle computing system 920 may obtain certain data for calibration using the camera and/or LIDAR sensors and may provide communication to the mobile computing system 970 regarding the obtained data, and other data to be obtained.

In some embodiments, the vehicle computing system 920 may provide instructions to the mobile computing system 970 to be displayed on the display 972 that the checkerboard is to be moved to a different location in space (e.g., translation) or is to be angled or tilted in a different direction (e.g., the pitch, roll, or yaw is to be adjusted). In these and other embodiments, visual cues may be provided, such as those illustrated in FIGS. 10A and 10B. Such calibration techniques using the checkerboard and feedback may be used to provide intrinsic camera calibration, extrinsic calibration, stereo camera calibration, etc. For LIDAR to camera calibration, such calibration may occur as the autonomous vehicle 950 is driven. In some embodiments, the user may interact with the mobile computing system 970 to indicate which calibration process to perform, such as intrinsic camera calibration, extrinsic calibration, stereo camera calibration, LIDAR to camera calibration, etc.

For intrinsic and/or extrinsic camera calibration, a detection algorithm may detect a portion of a checkerboard. When doing so, the system may capture more images near the corners of the images. The system may also utilize improvements to camera exposure, centering a camera optical center, or other image gathering improvements. Examples of such guidance and capture may be illustrated and described in FIGS. 10A and 10B.

When performing the camera to LIDAR calibration, an assumption may be made that the camera and/or LIDAR body frames may be moved (e.g., the vehicle 950 may be moving). To perform the calibration, a calibration board may be placed at a fixed location within view of the LIDAR and camera sensors. The vehicle 950 may be moved with the LIDAR and camera sensors rigidly mounted to the vehicle 950 in view of the calibration board. For any two frames, the image coordinates of the same corner of the calibration board in the corresponding two images may provide one 2D point to 2D point correspondence. The system may use an iterative closest point (ICP) process to compute the relative LIDAR transform between the two LIDAR positions. Each correspondence (e.g., each of the 2D point to 2D point correspondences, and each of the LIDAR transforms) may be used as a coplanarity constraint that may be used in solving for the overall transform. For example, each of the coplanarity constraints may be used to minimize the square sum of all of the coplanarity constraints. Such an approach may utilize a computer assisted solver (e.g., a Ceres Solver) or any other solving approach.

In some embodiments, the coplanarity constraints may be described mathematically. For example, given a camera/LIDAR at position $x_0$ at time $t_0$ and at position $x_1$ at time $t_1$, the transform $\Delta T_c$ of the camera between the two time points may be represented by $$\Delta T_c = T_{CL}^{-1} \cdot \Delta T_L \cdot T_{CL} = [\Delta R_c, \Delta t_c]$$

where $\Delta R_c$ may represent the rotation of the camera, $\Delta t_c$ may represent the change in the three dimensional coordinates (the translation) of the camera, $T_{CL}$ may represent the transform from camera to LIDAR, $\Delta T_L$ may represent the transforms between the LIDAR positions. Additionally, the camera projection matrix ($M_{proj}$) may be presented by:

$$M_{proj} = [K_{3 \times 3} | 0]_{3 \times 4}$$

The coplanarity constraint may be represented by $$x_0^T K^{-T} S_b \Delta R^{-1} K^{-1} x_1 = 0$$

which may also be reduced to $$x_0^T F x_1 = 0$$

where F is the fundamental matrix between the two camera positions and where $S_b$ represents a skew matrix derived from the translation part of the relative transform between the two cameras expressed above, where $$S_b = [0 - \Delta t_{C3} \Delta t_{C2} \Delta t_{C3} 0 - \Delta t_{C1} - \Delta t_{C2} \Delta t_{C1} 0]$$

In some embodiments, after the calibration board may be placed at a fixed location within view of the LIDAR and camera sensors, the vehicle 950 may be driven towards the calibration board while capturing forty five frames. Using the frames, the LIDAR to camera sensor calibration may be performed. Such solving may take five minutes or less.

Figure 10A:
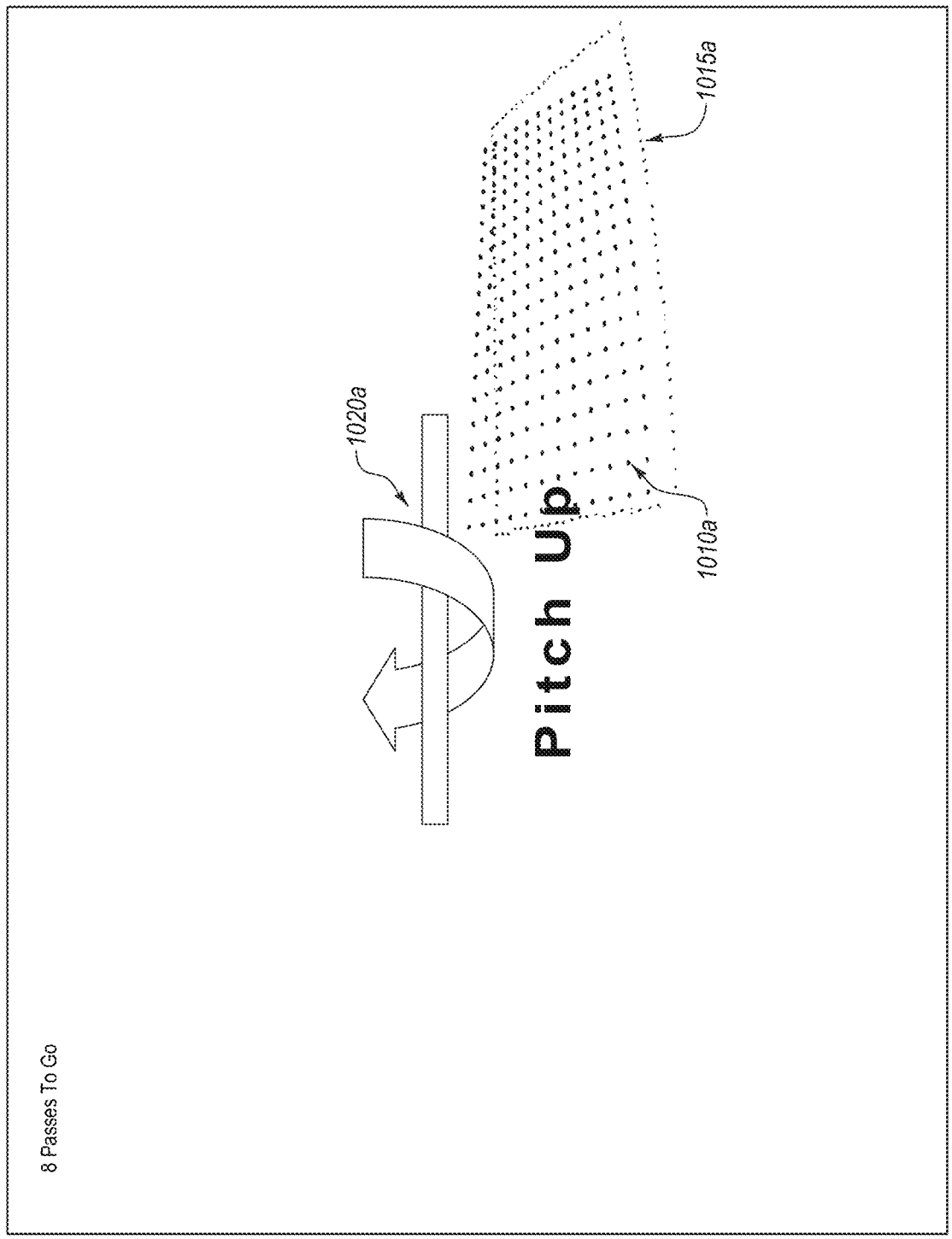
FIGS. 10A-10B illustrate a set of various example user interfaces used to facilitate interactive sensor calibration for autonomous vehicles.
Figure 10B:
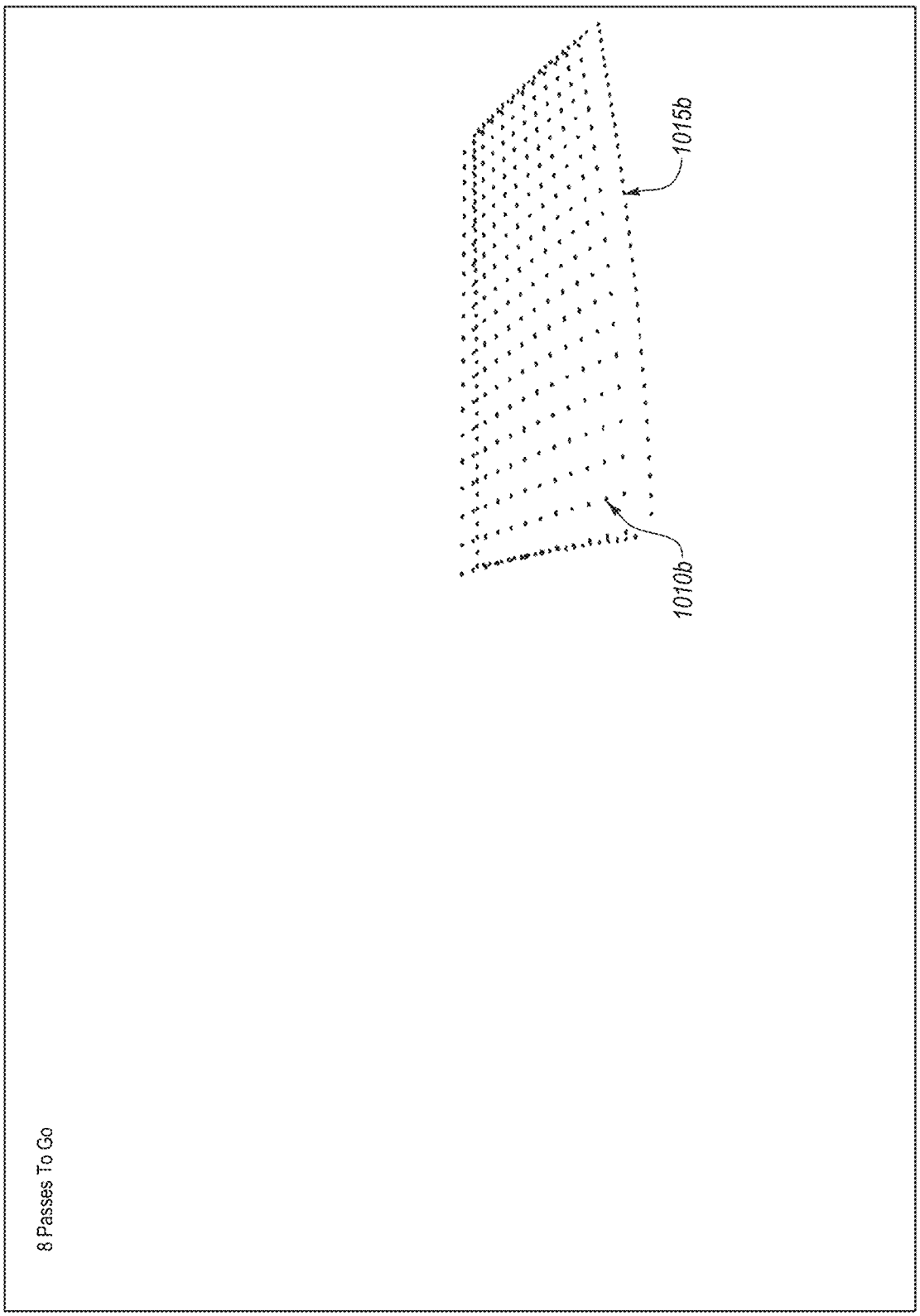

FIGS. 10A-10B illustrate a set of various example user interfaces 1000 used to facilitate interactive sensor calibration for autonomous vehicles. For example, FIG. 10A illustrates a current orientation 1010 of the calibration board, a target orientation 1015a of the calibration board, and/or instructions 1020 to facilitate aligning the current and target orientations.

For example, during the calibration process, the mobile computing system 970 may display a desired pose, which may be represented by the target orientation 1015a. Additionally, the display may show the real time detected checkerboard as the current orientation 1010. A user may move the calibration board to match the desired orientation. Although displayed as an abstraction of a checkerboard in the above image, in some embodiments, the display may include a real-time image or video of the user and checkerboard, as well as the target orientation 1015a. To make things easier, the mobile computing system may provide instruction about how to move the checkerboard to achieve this goal. These instructions may include Move Away, Move Close, Roll Clockwise, Roll CounterClockwise, Pitch Up, Pitch Down, Yaw Left, Yaw Right, etc. In some embodiments, the mobile computing system may display a color-coded signal indicating whether the checkerboard is close to the target orientation 1015a. For example, a signal may be displayed as a traffic light, with red illuminated if the checkerboard is not close to the target orientation 1015a, yellow illuminated if the checkerboard is close to the target orientation 1015a, and green illuminated if the checkerboard is in the target orientation 1015a. The mobile computing system may display a counter counting up the number of valid pictures captured in the orientation.

When the orientation is close enough to the target orientation 1015a, points of the bounding box of the target orientation 1015a may transition from a first color to a second color, such as blue to green. The mobile computing system may set thresholds, such as a translation threshold of 5 cm and/or a rotation threshold of 5 degrees. These two values may be configured to different values. When the bounding box of the target orientation 1015a changes color, a user may be instructed to hold the calibration board (e.g., checkerboard) still, as a stable checkerboard reduces blur in captured images, which may improve detection accuracy.

The mobile computing system may set a number of pixels (such as two) as the threshold to consider if checkerboard is still enough. After a set number of still frames in a row are collected (e.g., six still frames), the current orientation may be considered as finished and the mobile computing system may display a next target orientation, and capture additional images, etc. until all orientations are captured.

In some embodiments, the vehicle computing system may collect sixteen orientations for intrinsic calibration and twelve orientations for stereo calibration. The vehicle computing system may capture orientations on the image evenly and may provide the orientations close to the four corners of the images more than in other regions of the image.

After all orientations are collected, in-car software of the vehicle computing system may start to perform calibration computation. In these and other embodiments, computing time may be less than two minutes for intrinsic calibration, and thirty seconds for stereo calibration. In some embodiments, a reprojection error may be shown on the vehicle computing system display or the mobile computing system display to help indicate a quality of the current calibration. A user may then decide whether to deploy these calibration parameters to the vehicle computing system for operation.

Lidar-to-Camera Refinement

In some embodiments, the system may want a LIDAR-to-camera transform error to be less than 1 mrad in rotation, 1 cm in translation (<4 cm error at 30 meters). To achieve this target, existing techniques using nearby calibration objects may not be sufficient. Some embodiments may include a refinement procedure for a LIDAR-to-camera transform. The method may assume an approximate initial LIDAR-to-camera transform (with a transform error within 5 mrad and 5 cm to perfect solution), and may refines the transform error to within 1 mrad and 1 cm.

In some embodiments, the goal of the refinement may be to reduce the error to within 1 mrad and 1 cm. Some embodiments may have following features: (1) the system may be robust and work reliably in various environments, and as long as the assumptions are met, the system may produce a calibration within the target error, (2) the system may be easy to operate with guidance (similar to live calibration for camera intrinsics/extrinsics), with the process not taking more than 10 min, and (3) the calibration object may be portable so that refinement can be done at remote sites.

Figure 11:
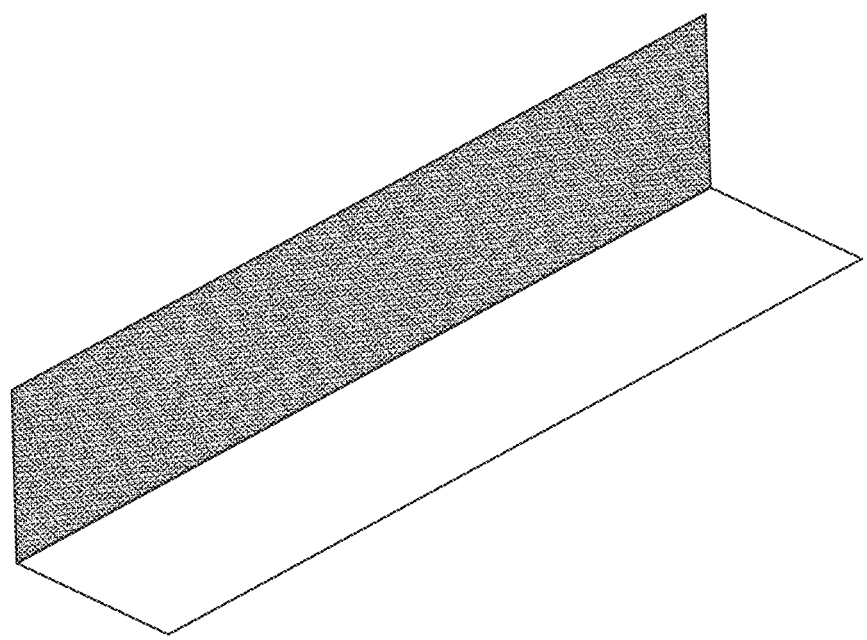
FIG. 11 illustrates a calibration object.

FIG. 11 illustrates a calibration object. As disclosed in FIG. 11, the calibration object may be an L-shaped calibration object formed by two orthogonal boards, one black and the other white. The calibration object may be portable by making one foldable board. The centerline (e.g., the intersection between the black board and the white board) may be used for calibration. During calibration, the calibration object may either stand vertically or lay on the ground. By placing the calibration object around the vehicle at predefined poses, the system may detect the centerline in both LIDAR data and camera images, and the system can refine calibration by maximizing the alignment between the two data sources.

In some embodiments, the board may be relatively large (e.g., in order to be detectable at a distance) but may not be significantly bigger than the stereo board. The board may also be foldable to improve its portability. However, the board may be configured such that when it unfolds, the black and white planes are always orthogonal to each other.

With respect to detection in LIDAR data, the system may not have to look for the calibration object everywhere in the scan. Placement of the calibration object may be predefined and may be guided by the interactive tool. Thus, the system can focus in the region where the calibration object is expected to be positioned. Before the calibration object enters the region, there may be no guidance on movement and the user may have to look at the raw data viewer. Once the calibration object enters the region, guidance may be provided to improve its pose, which may simplify the detection algorithm. In some embodiments, in order to detect the centerline, the system may fit the two orthogonal planes and find their intersection. Given a small search volume, once the system detects enough points inside, the system can trigger a centerline detection algorithm.

For example, a centerline detection algorithm may include, first, the system may iteratively fit the two dominant planes within the volume using the classic 3-point RANSAC algorithm for plane fitting. If either plane has too few inliers, the system may stop and wait for the pose to be improved. Second, the system may refine the fitting by the fact that the two planes are orthogonal to each other. A 5-point RANSAC algorithm may be employed achieve this. For example, during each iteration, the system may randomly sample three points from the points on the first plane, and the points from the points on the second plane, to fit two orthogonal planes and count inliers. The system may repeat this process to maximize the number of inliers. Finally, the centerline may be given by the intersection of the two orthogonal planes. This algorithm may work either when the calibration object is standing vertically or laying on the ground. In the latter case, however, plane fitting may fail as one of the planes may be very similar to the ground plane. In some embodiments, the plane that touches the ground may be made to be thick enough that the system can differentiate it from the ground.

With regard to detection in camera images, image-based detection may be similarly guided. The system may search for the object within a predefined search window. Once LIDAR-based detection produces output (e.g., one the calibration object is inside the search window), the system can trigger an algorithm to detect the centerline in an image. For example, a centerline detection algorithm in an image may include, first, the system may convert the image to grayscale and perform line fitting (e.g., either by RANSAC on high-gradient pixels or by Hough Transform). There may be multiple lines that are fit, but the one the system is looking for may have the most distinct colors on both sides. Also, an image-based centerline may be a line segment, so the system can easily observe it through multiple frames to determine whether it is stable (e.g., the calibration object is no longer moving).

With regard to pose computation, the system may define a board coordinate, with the origin on one end of the centerline, which is either the lower end if the object is standing vertically, or the end closer to the LIDAR if it is laying on the ground, with X pointing along the black side and Y pointing along the white side (e.g., and thus Z pointing to the other end of the centerline). Once the calibration object is detected in LIDAR, from its centerline and the two planes, the system can compute its pose and provide guidance accordingly. The system may capture a frame when (1) the detected pose is close enough to the suggested pose, and (2) the image-based centerline is stable (e.g., the calibration object is no longer moving).

With regard to placement, the system may use observations at a distance (e.g., up to 30 meters) to lock in rotation. The system may also use observations nearby to lock in translation. The calibration object may be placed vertically at k spots (e.g., approximately 3 spots) at a distance of distance d1 (e.g., approximately 5 meters) and distance d2 (e.g., approximately 30 meters) from the LIDAR. The object may also be placed on the ground along the longitudinal direction as well as the lateral direction at different distances.

With regard to optimization, the scoring function, in this case, may be the reprojection error between LIDAR-based centerline vs image-based centerline. Due to the sparse sampling of LIDAR, its centerline may be shorter than the image-based centerline, so the system may take the LIDAR-based centerline and calculate its average distance to the image-based centerline as a loss score (e.g., with the smaller loss score being better).

With regard to the use of faraway objects, the target error for calibration error may be 1 mrad rotation and 1 cm translation. The measurement error in the data may be significantly smaller than 1 mrad and 1 cm (e.g., order of magnitude smaller) in order for the system to meet this target error. For camera, this may be doable, but for LIDAR, this may be difficult if objects are nearby. Because LIDAR error may stay more or less constant over distance, at 30 meters the error may be reduced to 0.7 mrad<1 mrad. In some embodiments, there may be multiple observations (e.g., using hundreds of points to fit a plane) which may help cancel out some error (e.g., assuming independent Gaussian noise).

Online Calibration

Some embodiments may employ an online calibration module which may run in the vehicle and may subscribe to data collection. As the vehicle drives, the online calibration module may cache frames that it considers useful for calibration. Periodically (e.g., when sufficient data has been accumulated), the online calibration module may trigger a calibration (e.g., a refinement). The process may be repeated throughout the period of operation.

In some embodiments, the output from the online calibration may be used in a number of ways, depending on which mode the vehicle is operating in. In a calibration mode, the vehicle may be calibrated, in which case the online calibration may serve the purpose of calibration refinement. The online calibration may also provide an alternative when existing refinement algorithms fail (e.g., when there is not sufficient space around the vehicle at the calibration site). In a data collection mode (e.g., a map creation mode), the output from the online calibration may be saved with every track. If the parameters are sufficiently different, the online calibration may raise a flag during map creation, and the tracks affected may go through a calibration review with updated calibration before they are put in the map. If the online calibration fails to converge, the online calibration may raise a flag to stop data collection. In a localization mode, the output from the online calibration may be used to either (1) update default calibration parameters if confidence is high, or (2) signal a high risk in the perception module (e.g., which may rely on good calibration) if confidence is low or the algorithm fails to converge.

In some embodiments, online calibration may assume an approximate calibration (e.g., a not-too bad calibration) to start with. For example, online calibration may assume that at any time the calibration in a vehicle is within 5 mrad rotation and 5 cm translation to perfect calibration, which may be where the algorithm employed by online calibration can be effective. In some embodiments, the goal of online calibration may be to reduce the calibration error to be within 1 mrad rotation and 1 cm translation.

Some embodiments may include a system that is fully automatic calibration (refinement) algorithm that works with road data (e.g., no calibration patterns/objects). Unlike other calibration algorithms, the algorithm may not require stopping the vehicle at predefined locations. The system may be able to select frames automatically, during driving, which are good for calibration. The disclosed technique may work with various intensity levels of ground paint (e.g., due to paint in different regions tending to have different reflectivity) without manual parameter tuning. The system may be able to determine when it has sufficient data and may trigger automatically.

In some embodiments, the system may compute edge points in LIDAR data (e.g., adjacent points on a scan line exhibiting a large delta in a range) and may keep the edge points in the foreground (e.g., with shorter range). The system may also compute edge pixels in the image (e.g., pixels with high gradient). The system may define a scoring function for any LDIAR-to-camera transform, by transforming and projecting edge points to the image and computing the dot product with the edge pixels. Finally, the system may run a gradient descent by modifying one of the six degrees of freedom (DoFs) at a time while maximizing the scoring function.

In some embodiments, the system may also include the following additional features: (1) besides points on physical edges, the system may also detect points on intensity edges on the ground, which points may provide important constraints to pitch and translation in Y, and (2) instead of doing gradient descent, the system may perform a full search within a smaller search space, with one assumption being that, at any time during vehicle operation, its calibration error should be within a threshold mrad and a threshold cm, which may be achievable as long as the system properly validates calibration before the vehicle goes out. Within the small search space, a full search may be possible (e.g., testing about 1.8 million combinations), and the result may be a global optimum.

Some potential issues with the system may include the vehicle may needing to stop at spots where there are good features nearby (e.g., poles, buildings, ground paint). The algorithm may use all stopping frames for refinement. This may be achieved by careful route planning before refinement can be done, and it may be up to the driver to remember where to stop while keeping the vehicle in safe operation. Also, parameter tuning may often be needed during the refinement process, especially for intensity edge detection. Paint in different regions may tend to have different reflectivity, and the intensity may be very close to ground points (e.g., 0.05 vs 0). Parameter tuning may be tedious but may be necessary for refinement to work properly. Further, the algorithm may use all edge points/pixels available, regardless of distribution. The number of constraints can be highly skewed towards certain region in the shared FoV, resulting in biased calibration. Some embodiments address these potential issues, and extend conventional offline refinement processes for online calibration.

With regard to pose computation, one potential bottleneck may be a requirement for stationary frames, which may significantly reduce usability because this requirement may require the driver to pay attention to surrounding features to decide where to stop while keeping the vehicle in safe operation. To eliminate this requirement, the system may compute vehicle pose. Knowing the pose may allow the system to unwind point clouds properly and use all frames regardless of vehicle motion. The system may run ICP on every adjacent pair of frames (or as frequently as possible). ICP may have a check on pose trustworthiness, which the system may make use of. The system may have a lot of redundant road features to work with, so the system may not have to run ICP for every pair of frames or may lose a significant number of frames that do not pass the ICP check. After the ICP check, the system may further discard the frames where the vehicle is undergoing rotation, as motion interpolation (and thus unwinding for image projection) may be likely to be inaccurate in these cases.

With regard to ground intensity profiling, paint in different regions may tend to have different reflectivity. Instead of tuning the threshold for intensity edges manually, the system may profile ground intensity and may select this threshold automatically (and may update it over time automatically). At every moving frame, the system may separate ground points from non-ground points, and may update a histogram of ground point intensity. The system may skip stationary frames to avoid skewing the histogram. This can be done by skipping frames that are less than X meters (e.g., 3 meters) away from the last processed frame. Periodically, the system can check the histogram built over the last Y meters (e.g., 1000 meters), and may select a Z percentile (e.g., 1 percent) as the threshold for ground paint. This threshold may be used for subsequent intensity edge detection until it is updated.

With regard to frame selection, in an approach that uses all stationary frames (instead of only selecting certain frames): (1) the driver may need to know where to stop the car (e.g., based on what features are good for calibration), and (2) unintended stationary frames (e.g., in heavy traffic), which may not have good features, may also be used for calibration. If the system has a lot more frames to work with (e.g., all frames passing ICP and rotation checks), the system may use a frame selection algorithm that can: (1) select frames with the best features for calibration, (2) diversify features to provide a balanced distribution over a shared field of view (FoV), and (3) signal when sufficient features have been accumulated (e.g., and thus refinement can be triggered). In some embodiments, the system may focus on edge points in LIDAR data and may ignore edge pixels in images. Bad image features may exist but may be relatively rare. The system may add in more image-based checks such as bad exposure (e.g., a vehicle coming out of a tunnel).

Figure 12:
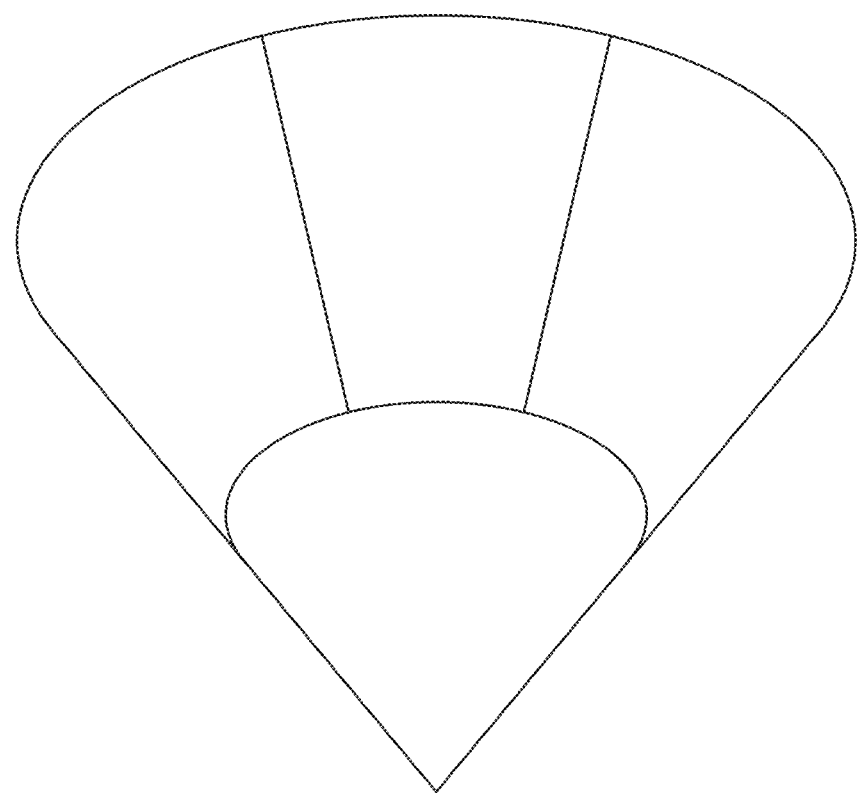
FIG. 12 illustrates a top-down field of view (FoV) division.

FIG. 12 illustrates a top-down field of view (FoV) division. in order to maintain a balanced distribution of features over shared FoV, the system may divide the FoV into a number of regions. As disclosed in FIG. 12, the shared FoV between a LIDAR and a camera may be divided into four regions. One division may be positioned near the vehicle may be configured to lock in translation, and three division farther away from the vehicle may be configured to lock in rotation. Similar subdivision may also be done in the vertical direction (e.g., by maintaining a certain ratio between ground and off-ground points). Initially all regions may have zero features, but each region may be filled up over time. During the process, the system may only add a frame if it contributes sufficient features to any region that is not full. When all the regions are full, refinement can be triggered automatically.

With regard to feature selection, the system may run into situations where many edge points are extracted from trees. Tree leaves can cause a range to be highly variable. Tree points, however, may be poor features for refinement, as nearby pixels may all have similar gradient and these points can be snapped to any of them without affecting the score. The system may give higher preference to points on straight lines for calibration since these points may tend to have unambiguous features in images. Given that in the real-world most edge points are on vertical edges, the system may test the quality of each edge point by looking for support (e.g., more edge points) in a cylindrical volume. In some embodiments, the system may merge multiple point clouds to make the techniques more robust, since the system may have the vehicle poses. The system may set a low threshold and may ensure every edge point kept has at least some edge points along the vertical direction. In some embodiments, in order to know which direction is vertical, the system may perform computations in vehicle coordinates. The system may assume a good LIDAR-to-vehicle transform, and may increase the radius of the cylinder to tolerate some error in LIDAR-to-vehicle transform and the not exactly vertical edges.

In some embodiments, online calibration may involve a vehicle driving with an online calibration process running in the background and looping over and over again.

The online calibration process may include collecting data from all the vehicle sensors (e.g., LIDARs, cameras, GPS/IMU, etc.).

The online calibration process may also include selecting and accumulating sensor frames based on the following two criteria. First, are there sufficient features in the shared field of view between LIDARs and cameras? For example, if the vehicle is moving through a forest, there is likely a lot of noise from tree leaves etc. and these frames are not likely to be suitable for calibration, but if the vehicle is moving through a street with many poles, buildings and lane markings on the ground, these frames are likely to be useful for calibration. Such features can be detected by a combination of the following three methods: (1) detecting LIDAR points on physical or intensity edges, where neighboring points on the same scan line exhibit very different range or intensity values, (2) detecting line structures from such edge points (e.g., poles, lane markings), and (3) detecting line structures from camera images (e.g., poles, lane markings). In detecting intensity edges on the ground (e.g., lane markings), and because different areas may use different paint and therefore see different intensity profiles, the system may employ Ground Intensity Profiling as described above. Second, is the system able to correctly unwind the LIDAR point clouds? If the car is moving, the system may need to unwind LDIAR point clouds to obtain the correct 3D geometry of points. This may be possible if one of the following three conditions is met: (1) the vehicle is not moving (e.g., IMU velocity is near zero), in which case no unwinding is needed, (2) the vehicle is moving and the system can get accurate pose information from RTK grade GPS/IMU, and there is a high confidence associated with the signal, or (3) the vehicle is moving and the system can get accurate pose information from alignment/fusion (e.g., using input from multiple sensors), and there is a high confidence associated with the pose information (as discussed above in connection with pose computation). In some embodiments, the system may not need to save the raw sensor data (e.g., LIDAR scans and images) which may be relatively large, but instead the system may only save the extracted features (e.g., the selected LIDAR points and image edge signals) which may be relatively small. The system may also not need to keep features all over the field of view, but only the features in feature-sparse regions (as discussed above in connection with frame selection and feature selection).

The online calibration process may also include the system deciding on when the system has accumulated enough sensor data. As described above in connection with frame selection, where the shared field of view between LIDAR and cameras is divided into a number of sections, the system may declare to have accumulated enough sensor data when there are sufficient features collected in each of these sections.

The online calibration process may also include, once the system has enough sensor data, the system starting an optimization to compute LIDAR-to-camera transforms, using any of a variety of optimization algorithms.

The online calibration process may also include, with the result from optimization, the system comparing it with the one in the vehicle and determine whether there is a large enough delta. If so, the system can either (1) send an alarm to the driver and request further inspection of the calibration parameters or (2) modify the calibration parameters in the vehicle, which may involve more risk and should only be done if the result has a high confidence associated with it. Alternatively, instead of making a decision after every optimization, the system can delay the decision until after N optimizations have been made, at which time the system will have N results to compare to the optimization in the vehicle, which may improve the accuracy of the decision (e.g., if all N results are consistent with each other, the system can associate a higher confidence to the optimization result, but if the N results are inconsistent, the system can associate a lower confidence to the optimization result, or even discard it all together).

In some embodiments, the algorithm may not need to process every single frame. For example, if available processing speed is not fast enough, the system can choose to process every K frame and still have sufficient data for calibration.

Closed-Form LIDAR-to-Camera Extrinsic Calibration

Some LIDAR-to-camera extrinsic calibrations may use a hand-eye calibration procedure to generate an initial guess using a checkerboard. However, the relative transform for a LIDAR and a camera may be produced independently and hence Z-axis translation may be unobservable (in addition to affecting other correlated parameters such as X-axis and Y-axis translation).

In some embodiments, the system may correlate observations in both LIDAR frame and camera frame, so the 6D of geometry parameters may all be observable and produced in a closed-form solution. This closed-form solution may be used as an initial guess for a diamond board refinement. Thus, some embodiments may use a closed-form solution for an initial guess of a LIDAR-to-camera transform.

Figure 13:
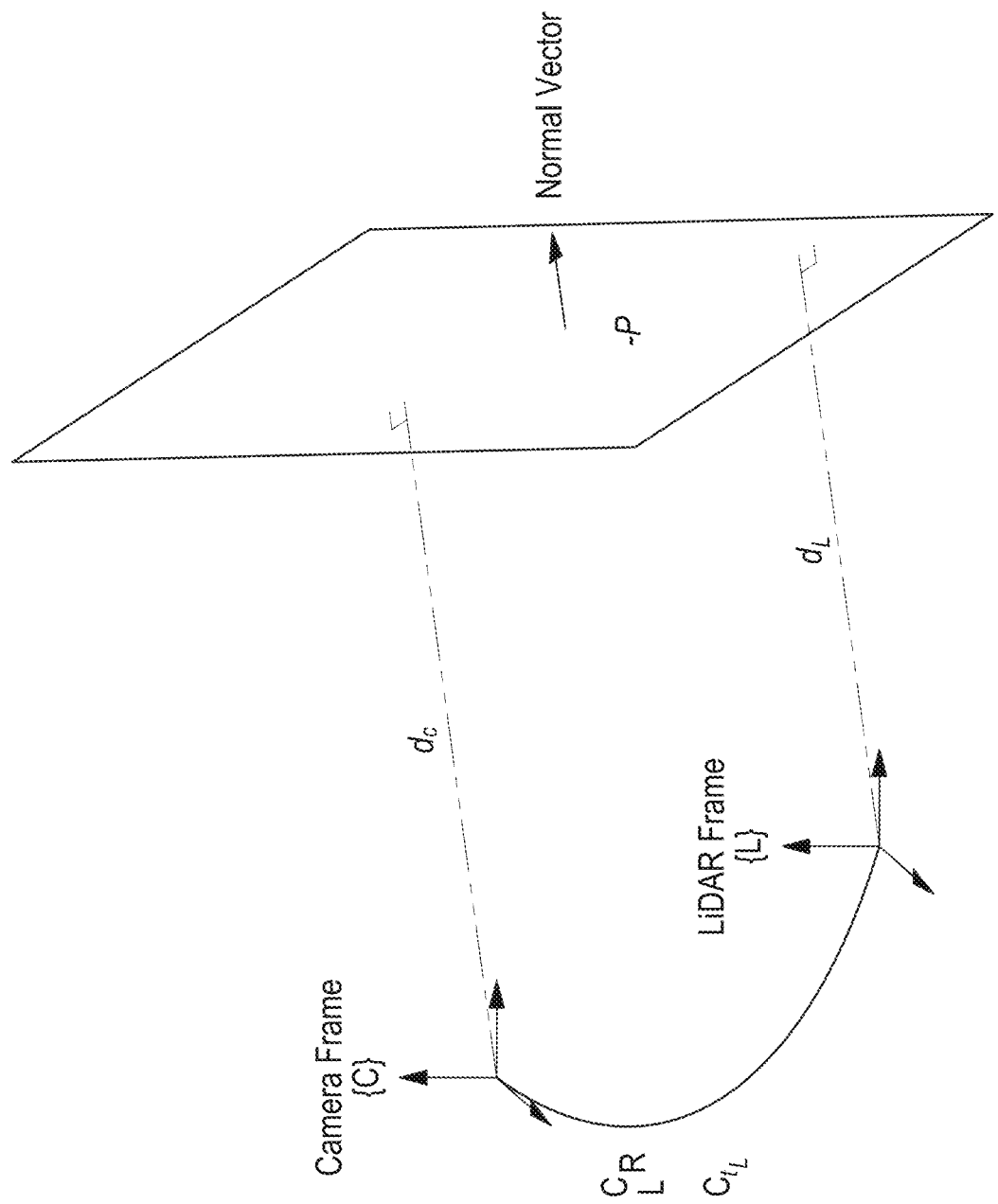
FIG. 13 illustrates a rotation and a translation from a camera frame to a LIDAR frame.

FIG. 13 illustrates a rotation and a translation from a camera frame to a LIDAR frame. In some embodiments, the system may perform the following computations in a LIDAR-to-camera extrinsic calibration algorithm:

$$\vec{N_C} = {}_L^C R \cdot \vec{N_L} \quad (1)$$

$$\vec{N_C}^T \cdot P^C - d_C = 0 \quad (2)$$

$$\rightarrow \vec{N_C}^T \cdot {}_L^C R \cdot P^L + {}^C t_L - d_C = 0$$

$$\rightarrow \vec{N_C}^T \cdot {}_L^C R \cdot P^L + \vec{N_C}^T \cdot {}^C t_L - d_C = 0$$

$$\rightarrow {}_L^C R \cdot \vec{N_C}^T \cdot P^L + \vec{N_C}^T \cdot {}^C t_L - d_C = 0$$

$$\rightarrow \vec{N_C}^T \cdot P^L + \vec{N_C}^T \cdot {}^C t_L - d_C = 0$$

$$\rightarrow \vec{N_C}^T \cdot {}^C t_L - d_L - d_C = 0$$

$$\rightarrow \vec{N_C}^T \cdot {}^C t_L = d_C - d_L$$

Where:
{C}: Camera frame
{L}: LIDAR frame
$\vec{N_C}$: Plane normal vector in camera frame
$\vec{N_L}$: Plane normal vector in LIDAR frame
$d_C$: distance from plane to {C}
$d_L$: distance from plane to {L}
${}_L^C R$: Rotation from {L} to {C}
${}^C t_L$: translation from {L} to {C}
${}^C P$: a point in {C}
${}^L P$: a Point in {L}

As disclosed in FIG. 13, with at least three non-parallel planes observed in both {L} and {C}, equation (1) and equation (2) can separately produce rotation and translation between {L} and {C}.

Figure 14:
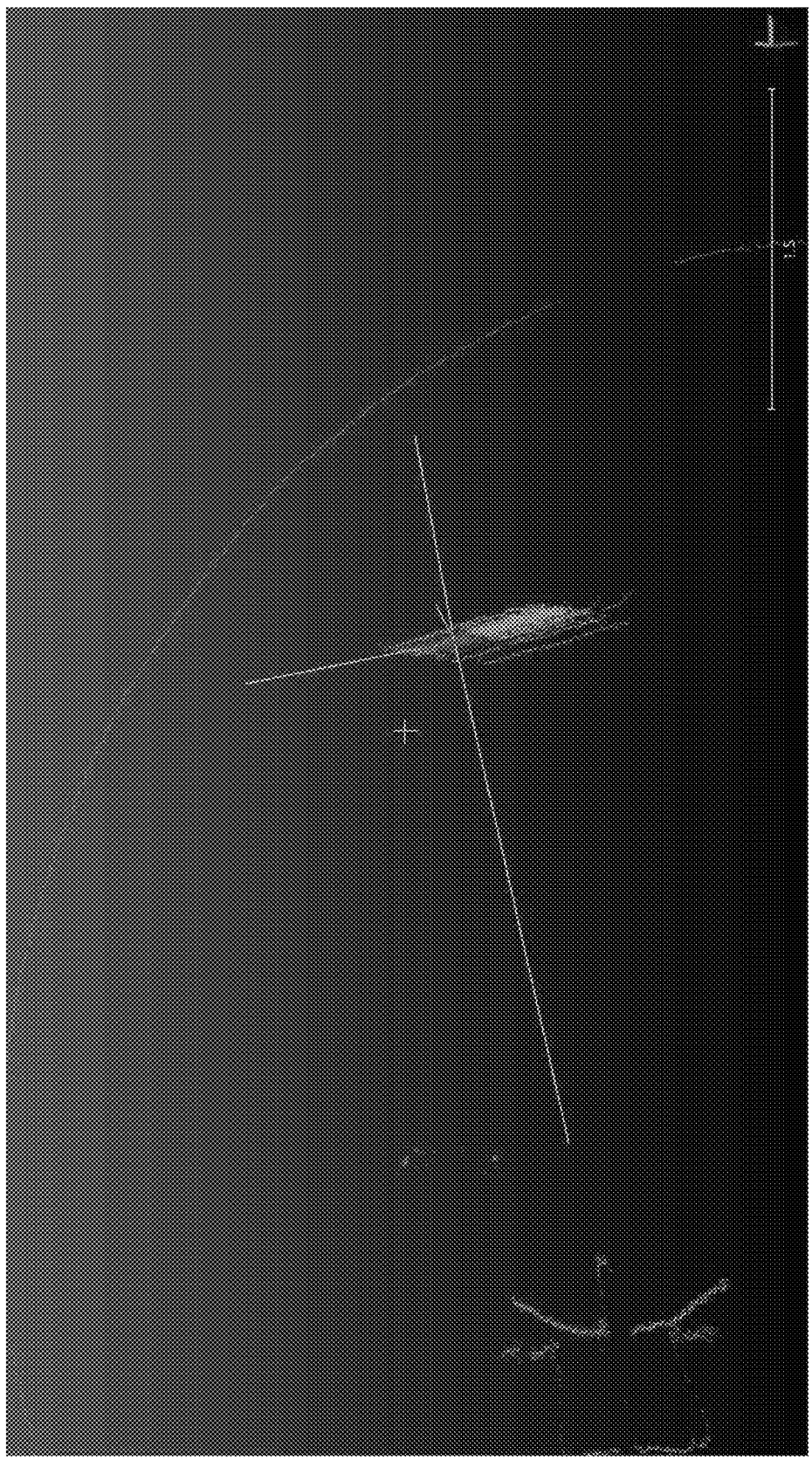
FIG. 14 illustrates a checkerboard plane extraction in a LIDAR frame.
Figure 15:
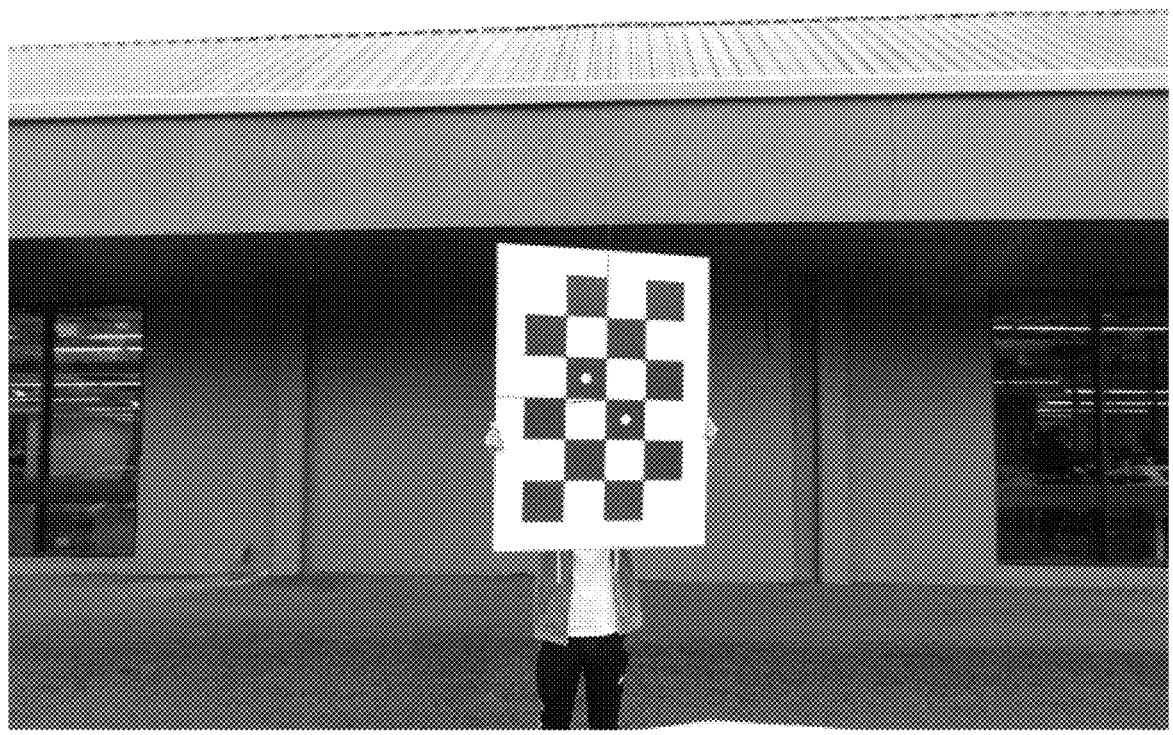
FIG. 15 illustrates a checkerboard plane extraction in a camera frame.
Figure 16:
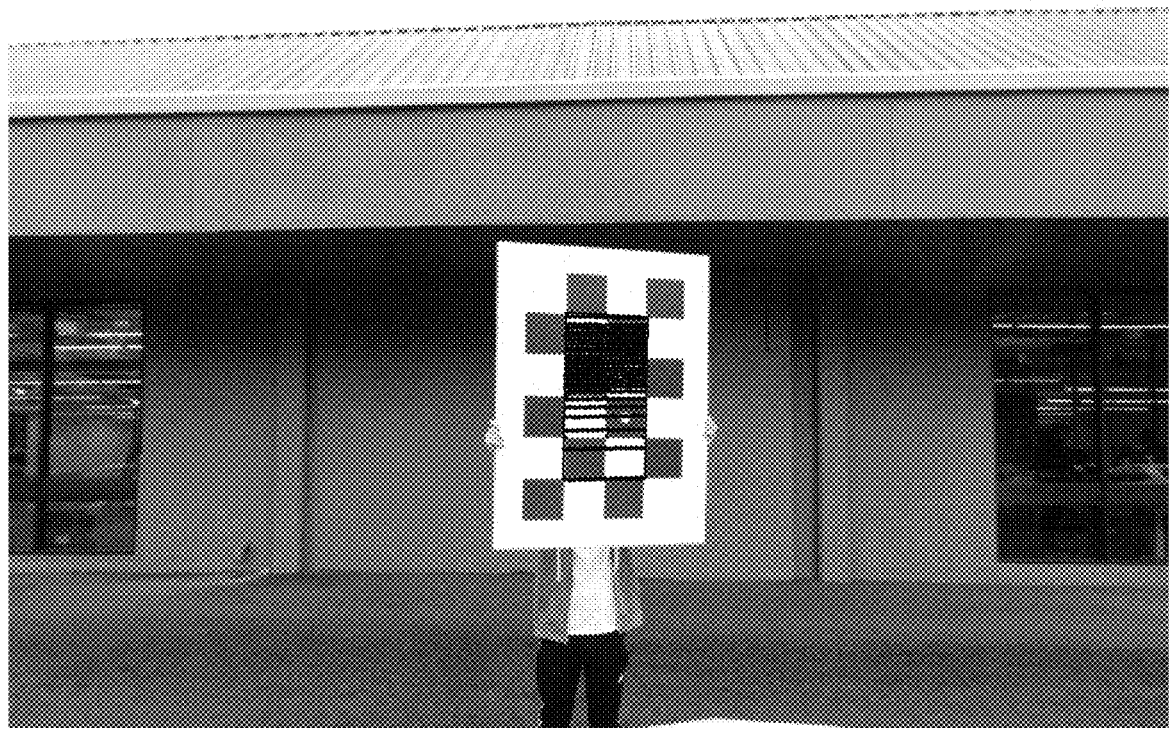
FIG. 16 illustrates LIDAR points projected onto a checkerboard plane in a camera image.

FIG. 14 illustrates a checkerboard plane extraction in a LIDAR frame. FIG. 15 illustrates a checkerboard plane extraction in a camera frame. FIG. 16 illustrates LIDAR points projected onto a checkerboard plane in a camera image. In some embodiments, a system may collect a set of sensor data from a Prius C using two sensors: VLP-32 LiDAR and left camera. In this example, a plane extraction result may be both good in the LIDAR frame (as disclosed in FIG. 14) and the camera frame (as disclosed in FIG. 15), but the final result (as disclosed in FIG. 16) may show a big difference compared to current refined LIDAR-to-camera extrinsics. As disclosed in FIG. 14, the system may produce a point cloud checkerboard plane extraction result in which there are four lines, with three of the lines being the plane's x-axis, y-axis, and z-axis, and the fourth line being a vector from LIDAR origin to specified plane origin. As disclosed in FIG. 15, the system may produce an image plane extraction result showing a checkerboard plane in image coordinates, with a red line as the x-axis, a green line as the y-axis, and a blue line as the z-axis. Also disclosed in FIG. 15 are fifteen red corners detected from the image and fifteen green corresponding corners re-projected form the checkerboard coordinates. As disclosed in FIG. 16, the system may project all LIDAR points onto the checkerboard plane.

With regard to a plane fitting algorithm, some LIDARs may have gaussian distribution noise along the laser ray's direction. The system may improve the plane fitting algorithm using LIDAR points and achieve much better accuracy in simulation of multi-plane based LIDAR-to-camera extrinsic calibration.

Figure 17:
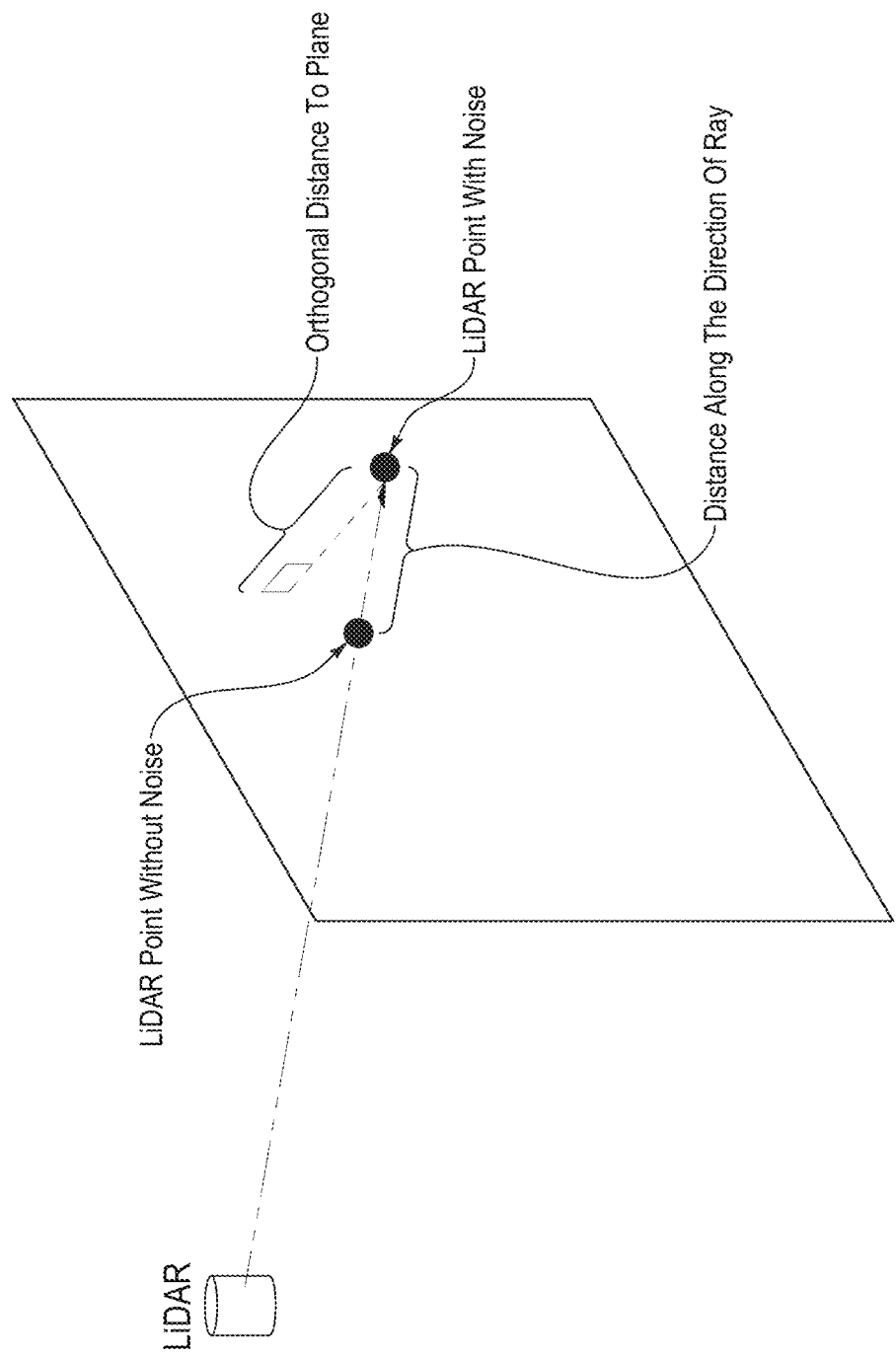
FIG. 17 illustrates measurement of a LIDAR point hitting a plane.

FIG. 17 illustrates measurement of a LIDAR point hitting a plane. As disclosed in FIG. 17, without any noise, the returned LIDAR point may be supposed to be the intersection of the laser ray and the plane. However, with Gaussian noise, the returned LIDAR point would not be perfectly lying on the plane as disclosed in FIG. 17. Further, most of the time, the laser rays' direction may not be parallel to the plane's normal vector direction. Therefore, the LIDAR point's distance to plane along the direction of the laser ray is usually larger than its orthogonal distance to the plane. Also, due to the different position and orientation of the plane, some points with a large distance along the direction of ray can have a relatively small orthogonal distance and vice versa. Due to this fact, if the plane fitting algorithm aims at minimizing the sum of square of the LIDAR points' orthogonal distance to plane (which is the case for least-square-based plane fitter), it may introduce bias to the fitted plane even enough LIDAR points are present. In order to cancel this bias, the system may use an improved cost function based on the distance along the direction of laser ray. The system may use the least-squares fitter to obtain a solution as an initial guess, and then apply Levenberg Marquardt to optimize plane parameters using the improved cost function.

Initial Sensor Calibration

In some embodiments, sensor calibration may include camera intrinsic parameters, camera and LIDAR transformation to vehicle coordinates, and camera timestamp calibration to align to GPS timestamp. In some embodiments, some of the features for calibrating a single camera's parameters may include (1) interactive camera intrinsics calibration where the user is guided to new board positions by indicating on a screen what the desired position is, (2) recalibration after every board position, which may be slow and not quite at an interactive speed, (3) computing an estimate of the sensitivity of the calibration to the taken board positions, then picking the next best board position (e.g., from a large set of possible poses) to most quickly improve the calibration (e.g., comping the Max Expected Reprojection error by simulating the calibration over random samples of the current board position and, for each, computing the average reprojection error, then taking the max of all these random calibrations), and (4) partially visible checkerboard detector which may use fancy checkerboards that are detectable and usable even if partially visible.

In some embodiments, additional features may include (1) the calibration framework applying to camera intrinsics calibration, stereo extrinsics calibration, and camera-to-LIDAR calibration. Further, additional features may include the system precomputing the board poses using a synthetic model of the sensors. Instead of minimizing Max Expected (average) error, the system may compute random sets of board poses to achieve a minimum "Max Max error", which gives the system a calibration with a statistical worst case result. The worst case result may be with respect to data within the field of view of the sensor and within some specified depth range of interest (e.g., 3 m to 15 m or 30 m). The system may include multiple captures/samples of each board position to minimize the effect of noise on the result (e.g., 4 may be a good balance between efficiency and accuracy).

In some embodiments, a basic measurement method may include single camera intrinsics in which the system optimizes 10 camera parameters (focal point, center of projection, 6 distortion) and the system measures the distortion error after calibration at every pixel and takes the max error. The basic measurement method may also include stereo camera extrinsics in which the system optimizes 6DOF transformation between two cameras, and the system measures the pixel reprojection error of points between camera left and camera right, and the system takes a grid of multiple points which span the field of view of the first camera at various depths and then transforms them into the second camera coordinates using the computed transformation, and the system may then measure the reprojection error into the second camera, with the system taking the maximum of these 27 re-projected points. The basic measurement method may also include camera to LIDAR in which the system may optimize 6DOF transformation between camera to LIDAR, and the system may measure the 3D error of points between camera and LIDAR coordinates, and the system may take a grid of multiple points which span the field of view of first camera at various depths and then may transform them into LIDAR coordinates using the computed transformation, and the system may then measure the 3D error in the LIDAR coordinates, and the system may take the max of these 27 3D errors. The basic measurement method may also include the measure of error being independent of the calibration optimization method, with the system evaluating the resulting optimized parameters.

In some embodiments, the system may provide a robust partially visible checkerboard detection with a checkerboard with two white circles on the two innermost black squares. The system may provide interactive guidance that works remotely, so the person moving the board can see the feedback directly, which may include the current pose of the board, the desired pose, text directions on which way to move or rotate the board to get it to the right position, an indicator when the board is in the right position, and an indicator that indicates that the user has held the board steady long enough to collect the position N times (e.g., 4 times). In order for the system to generate text directions on which way to move or rotate the board to get it to the right position, the system may compute the pose of the board and may determine a succinct command to help the user move the board to the right position. For example, the system may detect the checkerboard pattern, and may solve for its pose using PnP in real time. Then the system may compute the pose difference in 6 DOF (x, y, z, roll, pitch, yaw). Then, the system may give translation and rotation suggestions, such as "move closer," "move away," "roll clockwise," "yaw left," etc. When the detected pose is close enough to the desired pose, the color of pose may become green, and there may be a notification sound (e.g., or other audio feedback) from the mobile device (e.g., the smartphone or iPad) to indicate that users should hold the board still enough until we the system can collect N frames (e.g., 4 frames). After every board position, the system may recalibrate fast enough that the system can adjust the display output without any visual delay in the user feedback interface. In some embodiments, the user may be moving the board rather quickly, so feedback at 10 Hz or better may be desired for the system to work efficiently. When the calibration is done, the result may be within the target accuracy at all pixels/points (e.g., from the simulated Max Max Error).

In some embodiments, the system may calibrate camera intrinsic parameters, extrinsic camera and LIDAR parameters (X-to-car transforms), and timestamps for all sensors. The system may guide the user on the collection of data, determines iterative estimates of the accuracy of the calibration so far, and provide a clear indication when the collection is complete, with an accuracy report. The guiding of the user on the collection of data may include (1) telling the user to hold still for N secs, move back/forward/left/right, tilt forward/backward, rotate clockwise/counterclockwise, etc., (2) giving the user an idea of how well the user is doing, and (3) guiding two users, with one user at the monitor and another holding the board, or guiding one user with commands via a mobile device app that can be attached to the back of the board. In some embodiments, the system may perform calibration which is: (1) immediate with clear results, (2) local with no need to move data to the cloud or to a desktop for processing (although it may be acceptable to move a small amount of data for historical purposes that may be useful when debugging a calibration problem, such as a small set of samples used for the calibration, computation, and validation), (3) repeatable with known precision (e.g., the system can say with high certainty what the error of calibration is), (4) relatively fast (e.g., the system may be interactive and may guide the user in positioning targets and may indicate when a position is not yet correct so that the data can be collected in minimal time), (5) portable such that the user can perform calibration with only a binary and easily transportable or producible target, and (6) compatible in that the system may use DeepMap Data Collection API to pull the data and/or may import data from other APIs (e.g., ROS).

LIDAR to Camera Calibration

In some embodiments, the calibration constraints may be focused on matching a point from LIDAR to a line in the image. The error may minimize the sum of squared projection errors from the LIDAR points to the image lines. The system may rely on detecting lines in the image and points from the LIDAR that are on those lines. In some embodiments, detecting LIDAR edge points may be feasible even given low vertical resolution LIDARs. In some embodiments, the system may (1) provide an interactive calibration method, whose accuracy can be estimated along the way (e.g., while providing a confident stopping criterion), (2) provide an interactive estimate of the sensitivity of our result within our relevant field of view and depth, (3) and provide a way to guide the user to collect data that will finish the calibration as quickly as possible.

In some embodiments, steps for LIDAR to camera calibration may include iterate until the estimated error, $R_{Sample,i}$ is within tolerance (Xcm), and may include: (1) Tell the user where to stand (relative to the camera), (2) Take an Image/LIDAR pair and compute correspondences between the LIDAR (3D points on the edges) $P_{Lj}$ and the Camera (2D edge lines) $LINE_j$, (3) Estimate the calibration parameters $T_{CAL,i}$ from the FULL SET of correspondences $<P_{Lj}, LINE_j>$, (4) Create N sampled calibration parameters $T_{SampleCAL,i,j}$ by performing the calibration estimation over the correspondences with added measurement noise, (5) For each $T_{SampleCAL,i,j}$, project the 27 simulated camera points, $X_{SampleC,j}$ to the LIDAR coordinate system $X_{SampleL,i,j}$, (6) For each set of projected simulated points in LIDAR coordinates, $X_{SampleL,*,j}$ compute the radius of each set as $X_{SampleL,j}$, and (7) Compute the max of $R_{Sample,j}$, this is our estimate of the error of the $T_{CAL}$. Additional details regarding various of these steps will now be described.

With regard to step (1), for the initial position, it may be the center of the field of view and relatively close to the camera. For subsequent positions, the system may use a standard set of positions and may select the one that most improves the current calibration (e.g., by simulating adding such collections and evaluating the resulting error).

With regard to step (2) the image and LIDAR may be preferably captured while the target is still. For example, the system may count off a time interval (e.g., one or more seconds) and may take the data from the mid-point of the time interval. The system may thereby create a target which gives several clearly detected line constraints that are reliable to detect in both the camera and the LIDAR. The system may estimate the line intersection in the LIDAR and the lines in the image.

With regard to step (3), for the first image/LIDAR scan pair taken, it may be necessary to estimate the pose of the board in the image and the LIDAR. With 3 or 4 rows of LIDAR overlapping the board, this should be possible. With the estimated pose, the system may solve the PnP to get our initial estimate of the $T_{CAL,INIT}$ 6DOF transform parameters from LIDAR to Camera coordinates. $T_{CAL,INIT}$ may be used to initialize the parameters for the calibration search, which may be immediately followed by minimizing the error metric as follows $$U_{Ci} = T_{CAL} * P_{Li}$$

$$x_{Ci} = [U_{Ci\_x}/U_{Ci\_w}, U_{Ci\_y}/U_{Ci\_w}] \text{ // in image coordinates}$$

$$ERROR(T_{CAL}) = \text{sum distance}(LINE_i, x_{LCi})^2$$

// squared errors of point to line where $LINE_{Ci}$ is the image coordinate line that matches $P_{Li}$
This may give the system $T_{CAL,0}$ for the first iteration. Subsequent iterations may use $T_{CAL,i-1}$ as the initial guess from which to optimize $ERROR(T_{CAL})$.

With regard to step (4), in this step the system may explore the sensitivity of the calibration parameters with respect to the input data uncertainty model. For each LIDAR point $P_{Li}$, the system may add Gaussian noise to the measurement based on a LIDAR specific error model. For the image constraints, the system may add noise to the computed image line. For example, the system may add an error in the orthogonal direction to the line and then a rotation about the center of the line. After resampling the LIDAR points and image lines, the system can compute $T_{SIM\_CAL,i,j}$ to optimize the metric. The system may repeat this N times to create a set of sample calibrations which represent the variability/stability of $T_{CAL,i}$ with respect to the input constraints.

With regard to step (5), the system may create a 3×3×3 grid of sample points in the camera's 3D coordinate system, which may be referred to as $X_{SampleC,i}$. These points may cover the field of view of the camera and depth of field that is of interest. The system may then take each sample calibration $T_{SampleCAL,i}$ and transform the camera points into the LiDAR frame, as follows: $X_{SampleL,i,j} = T_{SampleCAL,i}^{-1} * X_{SampleC,j}$. This may give the system a set of sample LIDAR coordinate points for each sample camera point $X_{SampleC,j}$.

With regard to step (6), for each jth sample point, the system may compute the radius of the set of $XT_{SampleL,*,j}$. This may be computed as half the max distance between two points in the set.

Directing Board Repositioning During Sensor Calibration for Autonomous Vehicles

Figure 18A:
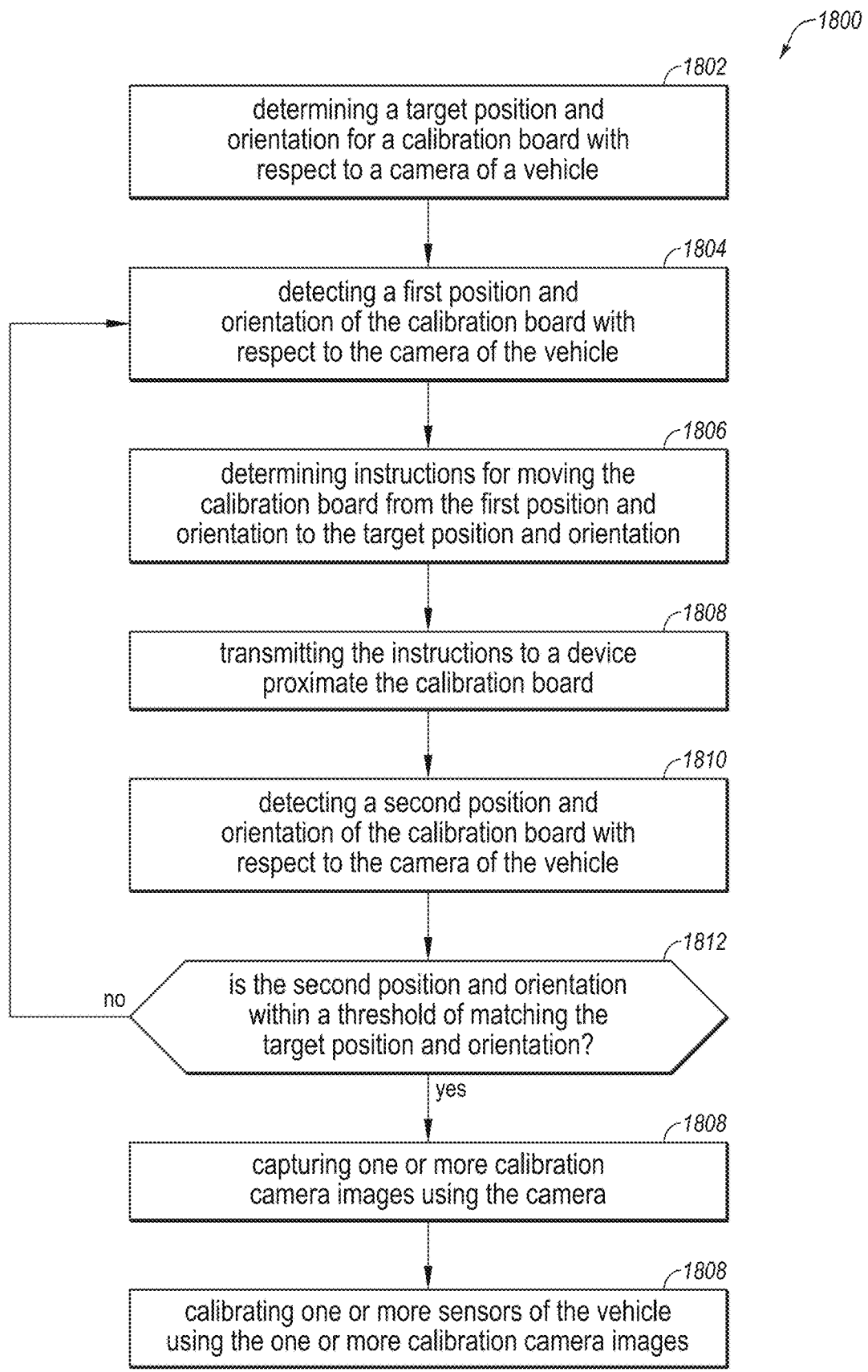
FIG. 18A illustrates a flowchart of an example method of directing board repositioning during sensor calibration for autonomous vehicles.

FIG. 18A illustrates a flowchart of an example method 1800 of directing board repositioning during sensor calibration for autonomous vehicles. The method 1800 may be performed by any suitable system, apparatus, or device. For example, one or more elements of the HD map system 100 of FIG. 1 may be configured to perform one or more of the operations of the method 1800. Additionally or alternatively, the computer system 2100 of FIG. 21 may be configured to perform one or more of the operations associated with the method 1800. Although illustrated with discrete blocks, the actions and operations associated with one or more of the blocks of the method 1800 may be divided into additional blocks, combined into fewer blocks, or eliminated, depending on the particular implementation.

The method 1800 may include, at action 1802, determining a target position and orientation for a calibration board with respect to a camera of a vehicle. For example, the sensor calibration module 290 may determine, at action 1802, a target position and orientation for a calibration board with respect to a camera of the vehicle 950.

The method 1800 may include, at action 1804, detecting a first position and orientation of the calibration board with respect to the camera of the vehicle. For example, the sensor calibration module 290 may detect, at action 1804, a current (first) position and orientation of the calibration board with respect to the camera of the vehicle 950.

The method 1800 may include, at action 1806, determining instructions for moving the calibration board from the first position and orientation to the target position and orientation. For example, the sensor calibration module 290 may determine, at action 1806, instructions for moving the calibration board from the current (first) position and orientation to the target position and orientation.

The method 1800 may include, at action 1808, transmitting the instructions to a device proximate the calibration board. In some embodiments, in response to receiving the instructions, the device may be configured to control a machine to automatically reposition the calibration board. In some embodiments, the device may comprise a mobile device, and in response to receiving the instructions, the mobile device may be configured to present corresponding directions to a user to guide the user in manually repositioning the calibration board. For example, the sensor calibration module 290 may transmit, at action 1808, the instructions to a device proximate the calibration board. The device may be the mobile computing system 970 (e.g., an app on a smart phone) so that the mobile computing system 970 can present corresponding directions to a user to guide the user in manually repositioning the calibration board. Alternatively, the device may be configured to control a machine (e.g., a robot, a drone, or any other machine capable of repositioning the calibration board) to automatically reposition the calibration board.

The method 1800 may include, at action 1810, detecting a second position and orientation of the calibration board with respect to the camera of the vehicle. For example, the sensor calibration module 290 may detect, at action 1810, a new current (second) position and orientation of the calibration board with respect to the camera of the vehicle 950.

The method 1800 may include, at action 1812, determining whether the second position and orientation is within a threshold of matching the target position and orientation. If so (yes at action 1812), the method may continue to action 1814. If not (no at action 1812), the method may return to action 1804. For example, the sensor calibration module 290 may determine, at action 1812, whether the new current (second) position and orientation of the calibration board is within a threshold of matching the target position and orientation of the calibration board. If so, the method 1800 may further include presenting an indication on the device (e.g., a mobile device) that the second position and orientation of the calibration board is within the threshold of matching the target position and orientation.

The method 1800 may include, at action 1814, capturing one or more calibration camera images using the camera.

For example, the sensor calibration module 290 may capture, at action 1814, one or more calibration camera images using the camera.

The method 1800 may include, at action 1816, calibrating one or more sensors of the vehicle using the one or more calibration camera images. For example, the sensor calibration module 290 may calibrate, at action 1816, the vehicle sensors 905 of the vehicle 950 using the one or more calibration camera images.

Figure 18B:
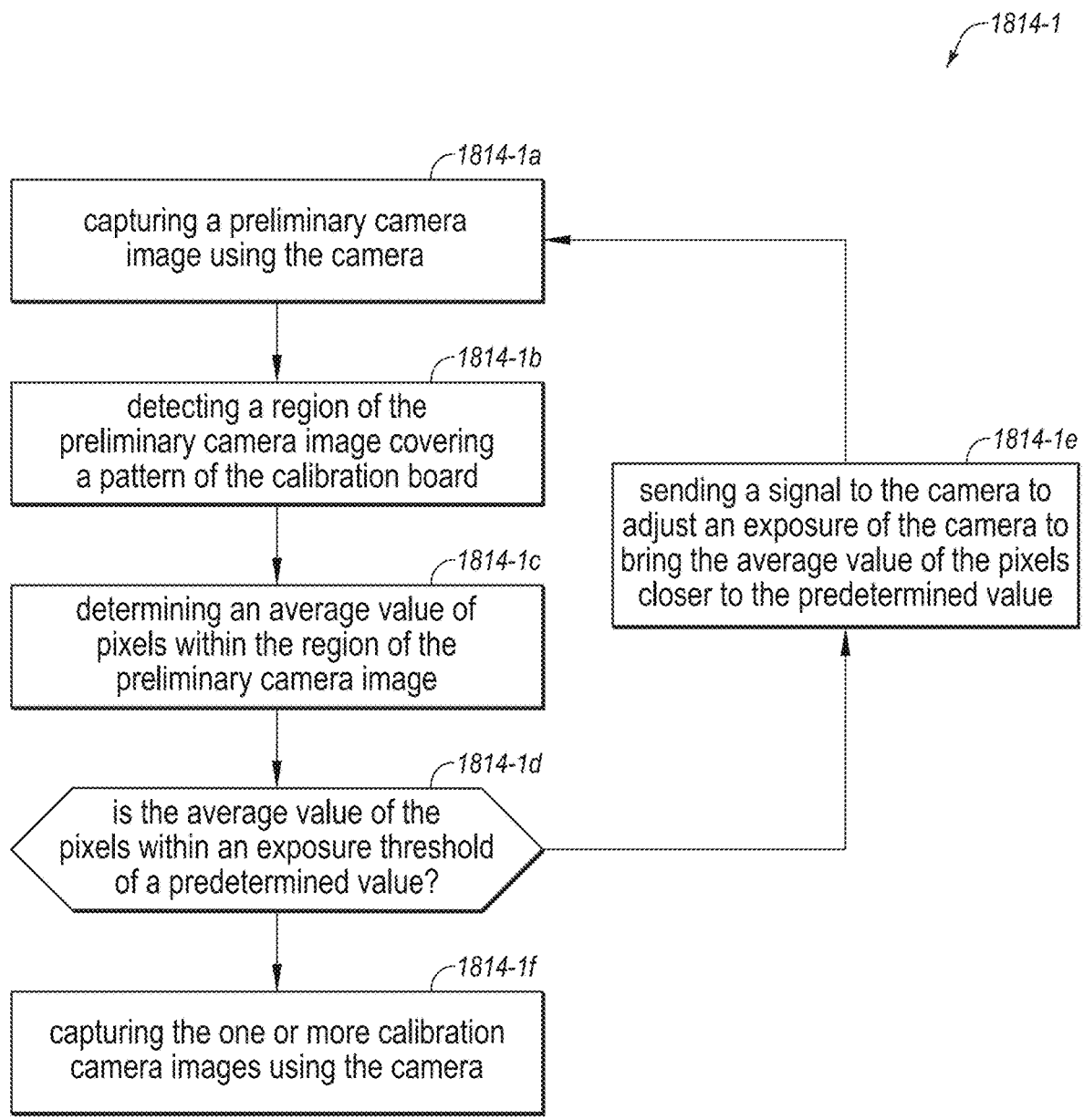
FIG. 18B illustrates a flowchart of an example method of camera exposure adjustment during sensor calibration for autonomous vehicles.

FIG. 18B illustrates a flowchart of an example method 1814-1 of camera exposure adjustment during sensor calibration for autonomous vehicles.

The method 1814-1 may include, at action 1814-1a, capturing a preliminary camera image using the camera. For example, the sensor calibration module 290 may capture, at action 1814-1a, a preliminary camera image using the camera.

The method 1814-1 may include, at action 1814-1b, detecting a region of the preliminary camera image covering a pattern of the calibration board. For example, the sensor calibration module 290 may detect, at action 1814-1b, a region of the preliminary camera image covering a pattern of the calibration board.

The method 1814-1 may include, at action 1814-1c, determining an average value of pixels within the region of the preliminary camera image. For example, the sensor calibration module 290 may determine, at action 1814-1c, an average value of pixels within the region of the preliminary camera image.

The method 1814-1 may include, at action 1814-1d, determining whether the average value of the pixels is within an exposure threshold of a predetermined value. If so (yes at action 1814-1d), the method may continue to action 1814-1f. If not (no at action 1814-1d), the method may continue to action 1814-1e, and then return to action 1814-1a. For example, the sensor calibration module 290 may determine, at action 1814-1d, whether the average value of the pixels is within an exposure threshold of a predetermined value.

The method 1814-1 may include, at action 1814-1e, sending a signal to the camera to adjust an exposure of the camera to bring the average value of the pixels closer to the predetermined value. In some embodiments, the adjusting of the exposure of the camera may comprise adjusting a size of an aperture of the camera, adjusting a shutter speed of the camera, or adjusting a sensitivity of a sensor of the camera toward light, or some combination thereof. For example, the sensor calibration module 290 may send, at action 1814-1e, a signal to the camera to adjust an exposure of the camera to bring the average value of the pixels closer to the predetermined value.

The method 1814-1 may include, at action 1814-1f, capturing the one or more calibration camera images using the camera. For example, the sensor calibration module 290 may capture, at action 1814-1f, the one or more calibration camera images using the camera.

Figure 18C:
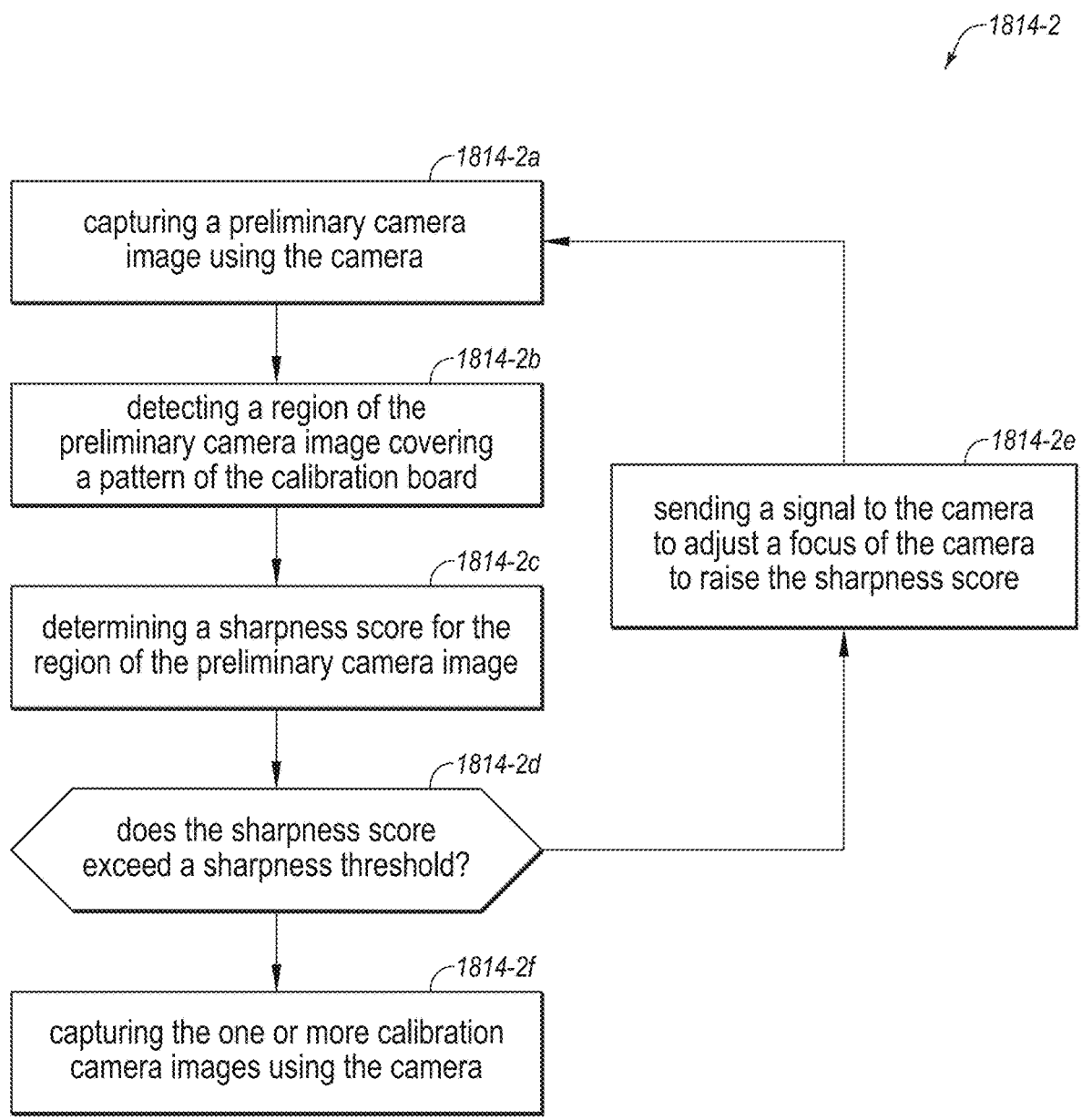
FIG. 18C illustrates a flowchart of an example method of camera focus adjustment during sensor calibration for autonomous vehicles.

FIG. 18C illustrates a flowchart of an example method 1814-2 of camera focus adjustment during sensor calibration for autonomous vehicles.

The method 1814-2 may include, at action 1814-2a, capturing a preliminary camera image using the camera. For example, the sensor calibration module 290 may capture, at action 1814-2a, a preliminary camera image using the camera.

The method 1814-2 may include, at action 1814-2b, detecting a region of the preliminary camera image covering a pattern of the calibration board. For example, the sensor calibration module 290 may detect, at action 1814-2b, a region of the preliminary camera image covering a pattern of the calibration board.

The method 1814-2 may include, at action 1814-2c, determining a sharpness score for the region of the preliminary camera image. For example, the sensor calibration module 290 may determine, at action 1814-2c, a sharpness score for the region of the preliminary camera image.

The method 1814-2 may include, at action 1814-2d, determining whether the sharpness score exceeds a sharpness threshold. If not (no at action 1814-2d), the method may continue to action 1814-2e, and then return to action 1814-2a. For example, the sensor calibration module 290 may determine, at action 1814-2d, whether the sharpness score exceeds a sharpness threshold.

The method 1814-2 may include, at action 1814-2e, sending a signal to the camera to adjust a focus of the camera to raise the sharpness score. For example, the sensor calibration module 290 may send, at action 1814-2e, a signal to the camera to adjust a focus of the camera to raise the sharpness score.

The method 1814-2 may include, at action 1814-2f, capturing the one or more calibration camera images using the camera. For example, the sensor calibration module 290 may capture, at action 1814-2f, the one or more calibration camera images using the camera.

Online Sensor Calibration for Autonomous Vehicles

Figure 19:
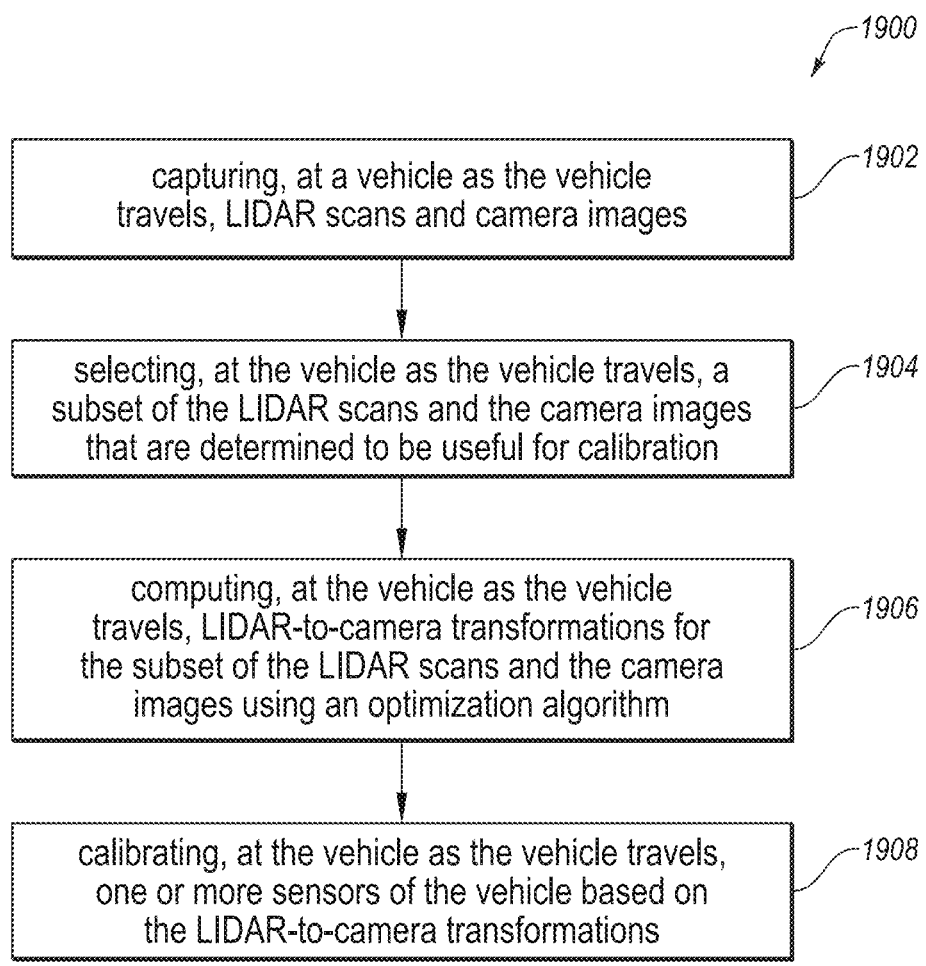
FIG. 19 illustrates a flowchart of an example method of online sensor calibration for autonomous vehicles.

FIG. 19 illustrates a flowchart of an example method 1900 of online sensor calibration for autonomous vehicles. The method 1900 may be performed by any suitable system, apparatus, or device. For example, one or more elements of the HD map system 100 of FIG. 1 may be configured to perform one or more of the operations of the method 1900. Additionally or alternatively, the computer system 2100 of FIG. 21 may be configured to perform one or more of the operations associated with the method 1900. Although illustrated with discrete blocks, the actions and operations associated with one or more of the blocks of the method 1900 may be divided into additional blocks, combined into fewer blocks, or eliminated, depending on the particular implementation.

In some embodiments, prior to action 1902, the method 1900 may include validating, prior to the vehicle beginning to travel, that an initial calibration of the one or more sensors of the vehicle is within a threshold. For example, the sensor calibration module 290 may validate, prior to the vehicle 150 beginning to travel, that an initial calibration of the sensors of the vehicle 150 is within a threshold.

The method 1900 may include, at action 1902, capturing, at a vehicle as the vehicle travels, LIDAR scans and camera images. For example, the sensor calibration module 290 may capture, at action 1902, LIDAR scans and camera images at the vehicle 150 the vehicle travels 150 (e.g., drives down a road). the sensor calibration module 290 may further capture other sensor data (e.g., GPS/IMU data) to use, for example, in determining the pose of the vehicle 150 in order to unwind LIDAR scans.

The method 1900 may include, at action 1904, selecting, at the vehicle as the vehicle travels, a subset of the LIDAR scans and the camera images that are determined to be useful for calibration. In some embodiments, the subset of the LIDAR scans and the camera images may be determined to be useful for calibration based on detecting straight line features in the LIDAR scans by separating ground points from non-ground points, profiling intensity of the ground points, and detecting intensity edges in the ground points. In some embodiments, the subset of the LIDAR scans and the camera images may be determined to be useful for calibration based on dividing a field of view of the LIDAR scans into multiple regions, and determining that each of the regions has sufficient straight line features to be useful for calibration. For example, the sensor calibration module 290 may select, at the vehicle 150 the vehicle travels 150, at action 1904, a subset of the LIDAR scans and the camera images that are determined to be useful for calibration.

The method 1900 may include, at action 1906, computing, at the vehicle as the vehicle travels, LIDAR-to-camera transformations for the subset of the LIDAR scans and the camera images using an optimization algorithm. In some embodiments, the computing of the LIDAR-to-camera transformations are based on an ability to unwind, at the vehicle, the LIDAR scans by determining accurate pose information for the vehicle while the vehicle is driving. For example, the sensor calibration module 290 may compute, at the vehicle 150 as the vehicle 150 travels, at action 1906, LIDAR-to-camera transformations for the subset of the LIDAR scans and the camera images using an optimization algorithm.

The method 1900 may include, at action 1908, calibrating, at the vehicle as the vehicle travels, one or more sensors of the vehicle based on the LIDAR-to-camera transformations. For example, the sensor calibration module 290 may calibrate, at the vehicle 150 as the vehicle 150 travels, at action 1908, one or more sensors of the vehicle based on the LIDAR-to-camera transformations.

Figure 20:
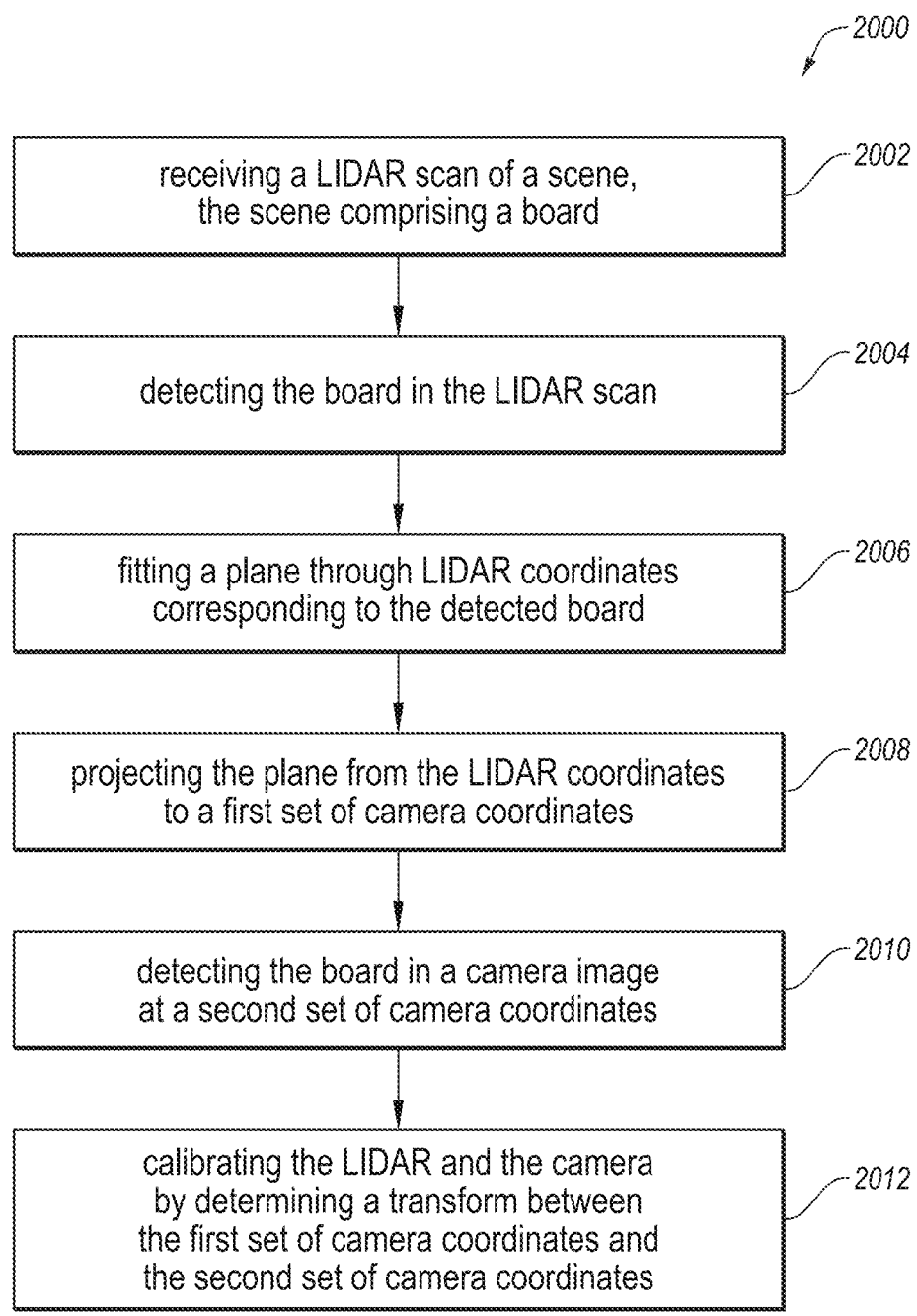
FIG. 20 illustrates a flowchart of an example method of LIDAR-to-camera transformation during sensor calibration for autonomous vehicles.

In some embodiments, the capturing, selecting, computing, and calibrating of the method 1900 may be performed online at the vehicle as the vehicle travels without requiring the vehicle to stop traveling LIDAR-to-Camera Transformation During Sensor Calibration for Autonomous Vehicles FIG. 20 illustrates a flowchart of an example method 2000 of LIDAR-to-camera transformation during sensor calibration for autonomous vehicles. The method 2000 may be performed by any suitable system, apparatus, or device. For example, one or more elements of the HD map system 100 of FIG. 1 may be configured to perform one or more of the operations of the method 2000. Additionally or alternatively, the computer system 2100 of FIG. 21 may be configured to perform one or more of the operations associated with the method 2000. Although illustrated with discrete blocks, the actions and operations associated with one or more of the blocks of the method 2000 may be divided into additional blocks, combined into fewer blocks, or eliminated, depending on the particular implementation.

The method 2000 may include, at action 2002, receiving a LIDAR scan of a scene, the scene comprising a board. In some embodiments, the board may have a relatively reflective diamond shape against a relatively dark and relatively unreflective background. In these embodiments, the relatively reflective diamond shape may be relatively easily visible by the LIDAR and the camera compared to the relatively dark and relatively unreflective background. In some embodiments, the board may have a checkerboard pattern with two white blocks each having a black dot therein or with two black blocks each have a white dot therein. In these embodiments, identification of the two white dots or the two black dots may enable identification of positions of all blocks of the checkerboard pattern because the two dots uniquely identify the two blocks that the two dots are within even if the checkerboard pattern is partially out of view. For example, the sensor calibration module 290 may receive, at action 2002, a LIDAR scan of a scene with the scene including a board.

The method 2000 may include, at action 2004, detecting the board in the LIDAR scan. For example, the sensor calibration module 290 may detect, at action 2004, the board in the LIDAR scan.

The method 2000 may include, at action 2006, fitting a plane through LIDAR coordinates corresponding to the detected board. For example, the sensor calibration module 290 may fit, at action 2006, a plane through LIDAR coordinates corresponding to the detected board.

The method 2000 may include, at action 2008, projecting the plane from the LIDAR coordinates to a first set of camera coordinates. For example, the sensor calibration module 290 may project, at action 2008, the plane from the LIDAR coordinates to a first set of camera coordinates.

The method 2000 may include, at action 2010, detecting the board in a camera image at a second set of camera coordinates. For example, the sensor calibration module 290 may detect, at action 2010, the board in a camera image at a second set of camera coordinates.

The method 2000 may include, at action 2012, calibrating the LIDAR and the camera by determining a transform between the first set of camera coordinates and the second set of camera coordinates. For example, the sensor calibration module 290 may calibrate, at action 2012, the LIDAR and the camera by determining a transform between the first set of camera coordinates and the second set of camera coordinates.

Subsequent to the actions of any of the methods 1800, 1900, or 2000, the calibrated sensors of the vehicle 150 may be employed in gathering data to update the HD map store 165, and/or in navigating the vehicle 150. Further, any of the methods 1800, 1900, or 2000 may be employed repeatedly prior to, during, or after the vehicle 150 navigates (or another non-autonomous vehicle) along a road. The vehicle 150 may navigate by sending control signals to controls of the vehicle 150.

Computer System Architecture

Figure 21:
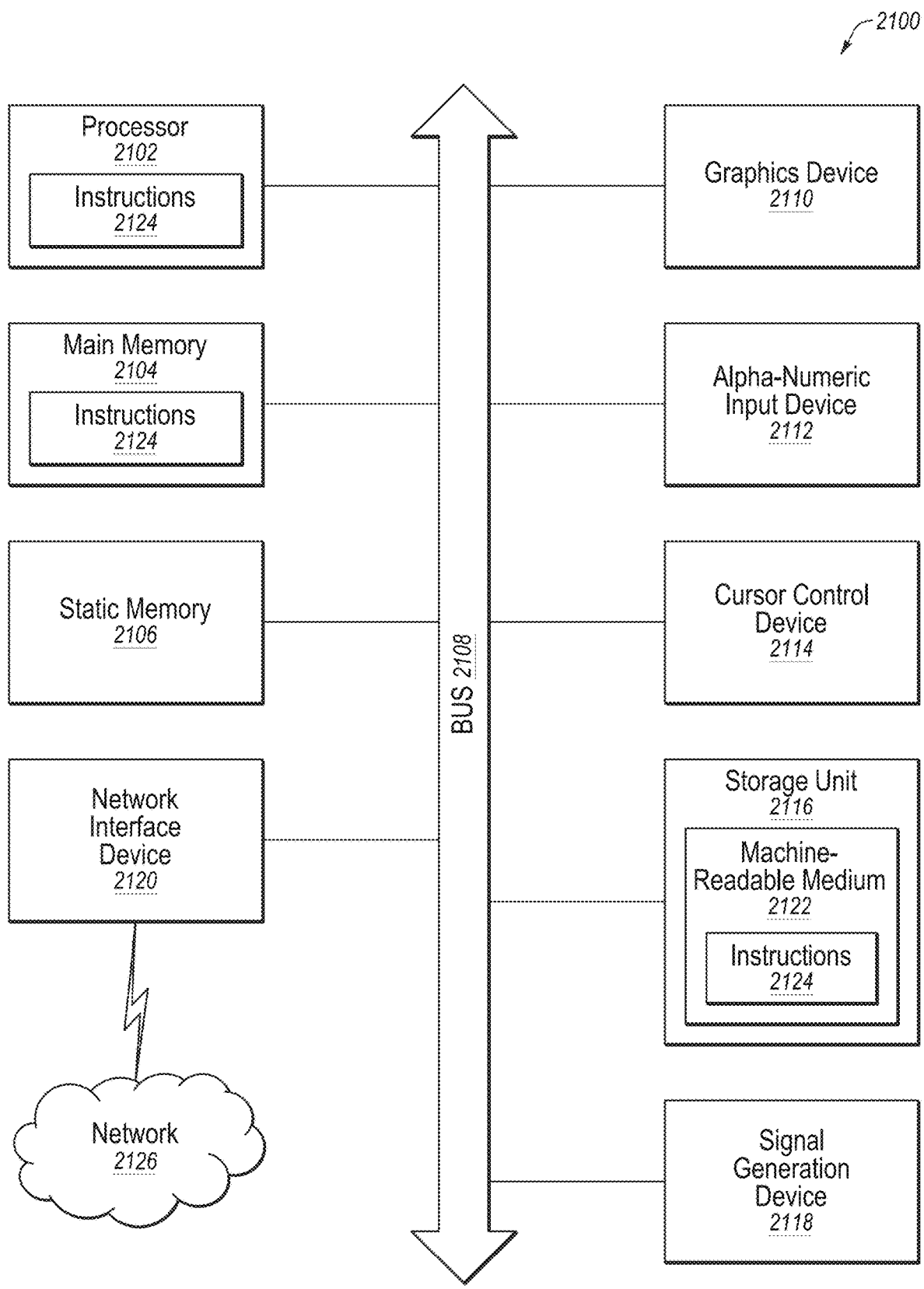
FIG. 21 illustrates an example embodiment of a computing machine that can read instructions from a machine-readable medium and execute the instructions in a processor or controller.

FIG. 21 is a block diagram illustrating components of an example computer system able to read instructions from a machine-readable medium and execute them in a processor (or controller). Specifically, FIG. 21 shows a diagrammatic representation of a machine in the example form of a computer system 2100 within which instructions 2124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2124 (sequential or otherwise) that specify actions to be taken by that machine. Further, while only a single machine is illustrated, the term "machine" shall also be taken to include any collection of machines that individually or jointly execute instructions 2124 to perform any one or more of the methodologies discussed herein.

The example computer system 2100 may be part of or may be any applicable system described in the present disclosure. For example, the online HD map system 110 and/or the vehicle computing systems 120 described above may comprise the computer system 2100 or one or more portions of the computer system 2100. Further, different implementations of the computer system 2100 may include more or fewer components than those described herein. For example, a particular computer system 2100 may not include one or more of the elements described herein and/or may include one or more elements that are not explicitly discussed.

The example computer system 2100 includes a processor 2102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2104, and a static memory 2106, which are configured to communicate with each other via a bus 2108. The computer system 2100 may further include graphics display unit 2110 (e.g., a plasma display panel (PDP), a liquid crystal display (LCD), a projector, or a cathode ray tube (CRT)). The computer system 2100 may also include alphanumeric input device 2112 (e.g., a keyboard), a cursor control device 2114 (e.g., a mouse, a trackball, a joystick, a motion sensor, or other pointing instrument), a storage unit 2116, a signal generation device 2118 (e.g., a speaker), and a network interface device 2120, which also are configured to communicate via the bus 2108.

The storage unit 2116 includes a machine-readable medium 2122 on which is stored instructions 2124 (e.g., software) embodying any one or more of the methodologies or functions described herein. The instructions 2124 (e.g., software) may also reside, completely or at least partially, within the main memory 2104 or within the processor 2102 (e.g., within a processor's cache memory) during execution thereof by the computer system 2100, the main memory 2104 and the processor 2102 also constituting machine-readable media. The instructions 2124 (e.g., software) may be transmitted or received over a network 2126 via the network interface device 2120.

While machine-readable medium 2122 is shown in an example embodiment to be a single medium, the term "machine-readable medium" should be taken to include a single medium or multiple media (e.g., a centralized or distributed database, or associated caches and servers) able to store instructions (e.g., instructions 2124). The term "machine-readable medium" shall also be taken to include any medium that is capable of storing instructions (e.g., instructions 2124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A computer-implemented method, comprising:
   determining a target position and orientation for a calibration board with respect to a camera of a vehicle;
   detecting a first position and orientation of the calibration board with respect to the camera of the vehicle;
   determining instructions for moving the calibration board from the first position and orientation to the target position and orientation;
   transmitting the instructions to a device proximate the calibration board;
   detecting a second position and orientation of the calibration board with respect to the camera of the vehicle;
   determining whether the second position and orientation is within a threshold of matching the target position and orientation; and
   in response to determining that the second position and orientation is within the threshold of matching the target position and orientation, capturing one or more calibration camera images using the camera and calibrating one or more sensors of the vehicle using the one or more calibration camera images.

2. The computer-implemented method of claim 1, wherein:
   in response to receiving the instructions, the device is configured to control a machine to automatically reposition the calibration board.

3. The computer-implemented method of claim 1, wherein:
   the device comprises a mobile device; and
   in response to receiving the instructions, the mobile device is configured to present corresponding directions to a user to guide the user in manually repositioning the calibration board.

4. The computer-implemented method of claim 3, further comprising presenting an indication on the mobile device that the second position and orientation of the calibration board is within the threshold of matching the target position and orientation.

5. The computer-implemented method of claim 1, wherein the capturing of the one or more calibration camera images using the camera comprises:
   (a) capturing a preliminary camera image using the camera;
   (b) detecting a region of the preliminary camera image covering a pattern of the calibration board;
   (c) determining an average value of pixels within the region of the preliminary camera image;
   (d) until the average value of the pixels is within an exposure threshold of a predetermined value, sending a signal to the camera to adjust an exposure of the camera to bring the average value of the pixels closer to the predetermined value and repeating (a)-(c); and
   (e) capturing the one or more calibration camera images using the camera.

6. The computer-implemented method of claim 5, wherein the adjusting of the exposure of the camera comprises adjusting a size of an aperture of the camera, adjusting a shutter speed of the camera, or adjusting a sensitivity of a sensor of the camera toward light, or some combination thereof.

7. The computer-implemented method of claim 1, wherein the capturing of the one or more calibration camera images using the camera comprises:
   (a) capturing a preliminary camera image using the camera;
   (b) detecting a region of the preliminary camera image covering a pattern of the calibration board;
   (c) determining a sharpness score for the region of the preliminary camera image;

(d) until the sharpness score exceeds a sharpness threshold, sending a signal to the camera to adjust a focus of the camera to raise the sharpness score and repeating (a)-(c); and (d) capturing the one or more calibration camera images using the camera.

8. One or more non-transitory computer readable media storing instructions that in response to being executed by one or more processors, cause a computer system to perform operations, the operations comprising:

determining a target position and orientation for a calibration board with respect to a camera of a vehicle;

detecting a first position and orientation of the calibration board with respect to the camera of the vehicle;

determining instructions for moving the calibration board from the first position and orientation to the target position and orientation;

transmitting the instructions to a device proximate the calibration board;

detecting a second position and orientation of the calibration board with respect to the camera of the vehicle;

determining whether the second position and orientation is within a threshold of matching the target position and orientation; and in response to determining that the second position and orientation is within the threshold of matching the target position and orientation, capturing one or more calibration camera images using the camera and calibrating one or more sensors of the vehicle using the one or more calibration camera images.

9. The one or more non-transitory computer readable media of claim 8, wherein:

in response to receiving the instructions, the device is configured to control a machine to automatically reposition the calibration board.

10. The one or more non-transitory computer readable media of claim 8, wherein:

the device comprises a mobile device; and in response to receiving the instructions, the mobile device is configured to present corresponding directions to a user to guide the user in manually repositioning the calibration board.

11. The one or more non-transitory computer readable media of claim 10, wherein the operations further comprise presenting an indication on the mobile device that the second position and orientation of the calibration board is within the threshold of matching the target position and orientation.

12. The one or more non-transitory computer readable media of claim 8, wherein the capturing of the one or more calibration camera images using the camera comprises:

(a) capturing a preliminary camera image using the camera;

(b) detecting a region of the preliminary camera image covering a pattern of the calibration board;

(c) determining an average value of pixels within the region of the preliminary camera image;

(d) until the average value of the pixels is within an exposure threshold of a predetermined value, sending a signal to the camera to adjust an exposure of the camera to bring the average value of the pixels closer to the predetermined value and repeating (a)-(c); and (e) capturing the one or more calibration camera images using the camera.

13. The one or more non-transitory computer readable media of claim 12, wherein the adjusting of the exposure of the camera comprises adjusting a size of an aperture of the camera, adjusting a shutter speed of the camera, or adjusting a sensitivity of a sensor of the camera toward light, or some combination thereof.

14. The one or more non-transitory computer readable media of claim 8, wherein the capturing of the one or more calibration camera images using the camera comprises:

(a) capturing a preliminary camera image using the camera;

(b) detecting a region of the preliminary camera image covering a pattern of the calibration board;

(c) determining a sharpness score for the region of the preliminary camera image;

(d) until the sharpness score exceeds a sharpness threshold, sending a signal to the camera to adjust a focus of the camera to raise the sharpness score and repeating (a)-(c); and (d) capturing the one or more calibration camera images using the camera.

15. A computer system comprising:

one or more processors; and one or more non-transitory computer readable media storing instructions that in response to being executed by the one or more processors, cause the computer system to perform operations, the operations comprising:

determining a target position and orientation for a calibration board with respect to a camera of a vehicle;

detecting a first position and orientation of the calibration board with respect to the camera of the vehicle;

determining instructions for moving the calibration board from the first position and orientation to the target position and orientation;

transmitting the instructions to a device proximate the calibration board;

detecting a second position and orientation of the calibration board with respect to the camera of the vehicle;

determining whether the second position and orientation is within a threshold of matching the target position and orientation; and in response to determining that the second position and orientation is within the threshold of matching the target position and orientation, capturing one or more calibration camera images using the camera and calibrating one or more sensors of the vehicle using the one or more calibration camera images.

16. The computer system of claim 15, wherein:

in response to receiving the instructions, the device is configured to control a machine to automatically reposition the calibration board.

17. The computer system of claim 15, wherein:

the device comprises a mobile device; and in response to receiving the instructions, the mobile device is configured to present corresponding directions to a user to guide the user in manually repositioning the calibration board.

18. The computer system of claim 17, wherein the operations further comprise presenting an indication on the mobile device that the second position and orientation of the calibration board is within the threshold of matching the target position and orientation.

19. The computer system of claim 15, wherein the capturing of the one or more calibration camera images using the camera comprises:

(a) capturing a preliminary camera image using the camera;

(b) detecting a region of the preliminary camera image covering a pattern of the calibration board;
(c) determining an average value of pixels within the region of the preliminary camera image;
(d) until the average value of the pixels is within an exposure threshold of a predetermined value, sending a signal to the camera to adjust an exposure of the camera to bring the average value of the pixels closer to the predetermined value and repeating (a)-(c); and
(e) capturing the one or more calibration camera images using the camera.

20. The computer system of claim 19, wherein the adjusting of the exposure of the camera comprises adjusting a size of an aperture of the camera, adjusting a shutter speed of the camera, or adjusting a sensitivity of a sensor of the camera toward light, or some combination thereof.

21. The computer system of claim 15, wherein the capturing of the one or more calibration camera images using the camera comprises:
(a) capturing a preliminary camera image using the camera;
(b) detecting a region of the preliminary camera image covering a pattern of the calibration board;
(c) determining a sharpness score for the region of the preliminary camera image;
(d) until the sharpness score exceeds a sharpness threshold, sending a signal to the camera to adjust a focus of the camera to raise the sharpness score and repeating (a)-(c); and
(d) capturing the one or more calibration camera images using the camera.

* * * * *